United States Patent
Miyazawa et al.

(10) Patent No.: US 10,723,574 B2
(45) Date of Patent: Jul. 28, 2020

(54) SHEET CONVEYANCE APPARATUS, DOCUMENT FEEDING APPARATUS, DOCUMENT READING APPARATUS, AND IMAGE FORMING APPARATUS

(71) Applicant: CANON KABUSHIKI KAISHA, Tokyo (JP)

(72) Inventors: Toru Miyazawa, Nagareyama (JP); Shigemi Kumagai, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/218,871

(22) Filed: Dec. 13, 2018

(65) Prior Publication Data
US 2019/0218047 A1    Jul. 18, 2019

(30) Foreign Application Priority Data
Jan. 16, 2018   (JP) ................................ 2018-004912

(51) Int. Cl.
*B65H 3/06* (2006.01)
*B65H 7/06* (2006.01)
(Continued)

(52) U.S. Cl.
CPC .............. *B65H 3/06* (2013.01); *B65H 5/062* (2013.01); *B65H 7/06* (2013.01); *B65H 7/12* (2013.01);
(Continued)

(58) Field of Classification Search
CPC . B65H 3/06; B65H 5/06; B65H 5/062; B65H 7/06; B65H 7/12; B65H 2511/51;
(Continued)

(56) References Cited

U.S. PATENT DOCUMENTS

2016/0154364 A1   6/2016   Kamata
2017/0288589 A1*  10/2017  Sato ....................... H02P 21/22
(Continued)

FOREIGN PATENT DOCUMENTS

JP   H11-119491 A   4/1999
JP   2009-126109 A  6/2009
(Continued)

*Primary Examiner* — David H Bollinger
(74) *Attorney, Agent, or Firm* — Canon U.S.A., Inc. I.P. Division

(57) ABSTRACT

A sheet conveyance apparatus includes a stacking unit having a sheet, a feeding unit, a conveyance roller to convey a sheet fed by the feeding unit, a motor to drive the conveyance roller, a phase determiner, first and second controllers, and a discriminator. The feeding unit feeds the sheet. The phase determiner determines a motor rotor rotational phase. The first controller controls a drive current flowing in a motor winding to reduce a deviation between an instructed phase of the motor rotor and the determined rotational phase. The second controller controls to perform a first drive for driving the conveyance roller for a predetermined time before a feeding unit feed operation is started. The discriminator discriminates presence or absence of the sheet at a nip portion of the conveyance roller based on a value of a parameter corresponding to load torque applied to the rotor during the first drive.

34 Claims, 17 Drawing Sheets

(51) Int. Cl.
*B65H 7/12* (2006.01)
*G03G 15/00* (2006.01)
*H04N 1/00* (2006.01)
*B65H 5/06* (2006.01)
*H02P 6/08* (2016.01)
*H02P 27/08* (2006.01)
*H02P 21/22* (2016.01)

(52) U.S. Cl.
CPC ........... *G03G 15/602* (2013.01); *H02P 6/085* (2013.01); *H02P 21/22* (2016.02); *H02P 27/08* (2013.01); *H04N 1/00602* (2013.01); *H04N 1/00631* (2013.01); *H04N 1/00689* (2013.01); *H04N 1/00793* (2013.01); *B65H 2511/51* (2013.01); *B65H 2511/528* (2013.01); *B65H 2515/32* (2013.01)

(58) Field of Classification Search
CPC ........ B65H 2511/528; B65H 2513/106; B65H 2515/32; G03G 15/602; G03G 15/6529; G03G 15/80; H04N 1/00602; H04N 1/00631; H04N 1/00689; H04N 1/00793; H02P 21/22; H02P 6/085; H02P 27/08
See application file for complete search history.

(56) References Cited

U.S. PATENT DOCUMENTS

| | | | |
|---|---|---|---|
| 2017/0291783 A1* | 10/2017 | Kumagai | G03G 15/6567 |
| 2018/0079611 A1* | 3/2018 | Kitamura | B41J 29/38 |
| 2018/0152126 A1* | 5/2018 | Nito | H02P 8/14 |
| 2018/0215565 A1* | 8/2018 | Ota | B65H 3/0684 |
| 2018/0309400 A1* | 10/2018 | Kitamura | H02P 21/22 |
| 2019/0260321 A1* | 8/2019 | Kitamura | B65H 5/06 |

FOREIGN PATENT DOCUMENTS

| | | |
|---|---|---|
| JP | 2013-209220 A | 10/2013 |
| JP | 2014-024614 A | 2/2014 |
| JP | 2016-102814 A | 6/2016 |
| JP | 2017-202934 A | 11/2017 |

* cited by examiner

SHEET CONVEYANCE APPARATUS, DOCUMENT FEEDING APPARATUS, DOCUMENT READING APPARATUS, AND IMAGE FORMING APPARATUS

BACKGROUND OF THE INVENTION

Field of the Invention

The present disclosure relates to motor control in a sheet conveyance apparatus, a document feeding apparatus, a document reading apparatus, and an image forming apparatus.

Description of the Related Art

A conventional image forming apparatus is known to be configured to, after completion of treatment of jam which has occurred during sheet conveyance, detect whether a sheet remains in a conveyance path, based on a detection result of a sheet sensor for detecting the presence or absence of a sheet (United States Patent Application Publication No. 2016/0154364).

However, in the configuration discussed in United States Patent Application Publication No. 2016/0154364, it is necessary to provide a sensor for detecting a sheet in the conveyance path, resulting in an increase in size of the image forming apparatus. In addition, provision of a sensor will increase the cost.

SUMMARY OF THE INVENTION

The present disclosure is directed to detecting a sheet with high accuracy in a lower cost configuration.

According to an aspect of the disclosure, a sheet conveyance apparatus includes a stacking unit on which a sheet is to be stacked, a feeding unit configured to feed the sheet stacked on the stacking unit, a first conveyance roller configured to convey the sheet fed by the feeding unit, a motor configured to drive the first conveyance roller, a phase determiner configured to determine a rotational phase of a rotor of the motor, a first controller configured to control a drive current flowing in a winding of the motor to reduce a deviation between an instructed phase representing a target phase of the rotor of the motor and the rotational phase determined by the phase determiner, a second controller configured to control the first controller to perform a first drive for driving the first conveyance roller for a predetermined time period before a feed operation by the feeding unit is started, and a discriminator configured to discriminate presence or absence of the sheet at a nip portion of the first conveyance roller based on a value of a parameter corresponding to load torque applied to the rotor during the first drive.

Further features of the present disclosure will become apparent from the following description of embodiments with reference to the attached drawings.

DESCRIPTION OF THE EMBODIMENTS

Embodiments of the present disclosure will be described below with reference to the accompanying drawings. However, shapes and relative arrangements of elements described in the embodiments are not limited thereto and are to be modified as appropriate depending on the configuration of an apparatus according to the present disclosure and other various conditions. The scope of the present disclosure is not limited to the embodiments described below. Although the following descriptions will be made centering on a case where a motor control apparatus is provided in an image forming apparatus, the apparatus in which a motor control apparatus is provided is not limited to an image forming apparatus. For example, a motor control apparatus is also used for a sheet conveyance apparatus for conveying a sheet such as a recording medium or a document.

[Image Forming Apparatus]

Figure 1:
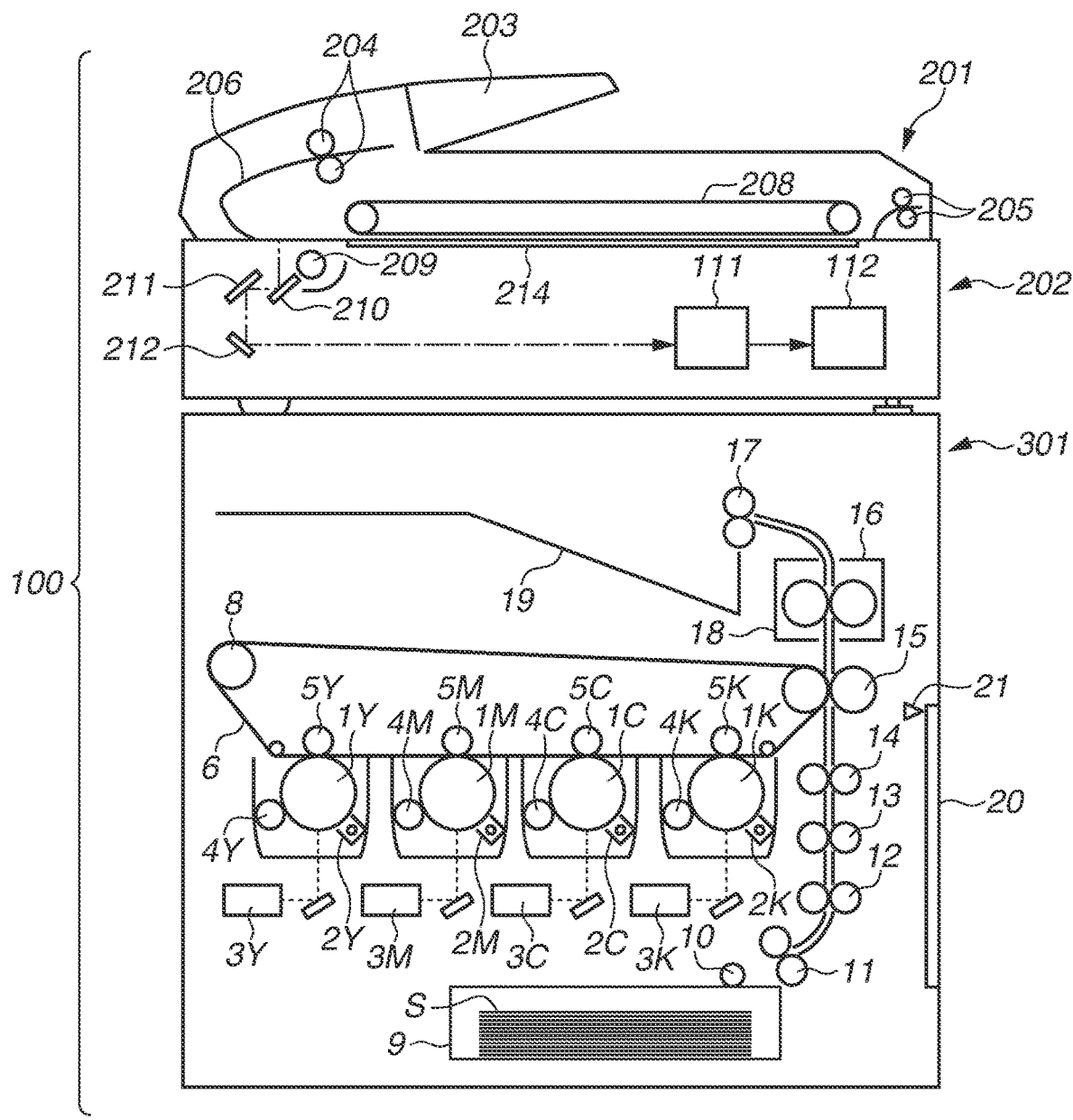
FIG. 1 is a sectional view illustrating an image forming apparatus according to a first embodiment.

FIG. 1 is a sectional view illustrating a configuration of an electrophotographic color copying machine (hereinafter referred to as an image forming apparatus) 100 having a sheet conveyance apparatus according to a first embodiment. The image forming apparatus is not limited to a copying machine and may be, for example, a facsimile machine, a printing machine, or a printer. The recording process is not limited to the electrophotographic system and may be, for example, an ink-jet process. In addition, a monochrome image forming apparatus and a color image forming apparatus are applicable.

The configuration and functions of the image forming apparatus 100 will be described below with reference to FIG. 1. As illustrated in FIG. 1, the image forming apparatus 100 includes a document feeding apparatus 201, a reading apparatus 202, and an image printing apparatus 301.

Document sheets stacked on the document stacking unit 203 of the document feeding apparatus 201 are fed one by one by a feed roller 204 and conveyed on a document positioning glass plate 214 of the reading apparatus 202 along a conveyance guide 206. Then, a document sheet is conveyed at a fixed speed by a conveyance belt 208 and then discharged onto a discharge tray (not illustrated) by a discharge roller 205. Reflected light from a document image illuminated by an illumination system 209 at the reading position of the reading apparatus 202 is led to an image reading unit 111 by an optical system including reflective mirrors 210, 211, and 212. Then, the light is converted into an image signal for each color (yellow, magenta, cyan, and black) by the image reading unit 111. The image reading unit 111 includes lenses, a charge coupled device (CCD) as a photoelectric conversion element, and a drive circuit of the CCD. An image signal output from the image reading unit 111 undergoes various correction processing by an image processing unit 112 including a hardware device such as an application specific integrated circuit (ASIC) and then is output to the image printing apparatus 301. A document sheet is read in this way. More specifically, the document feeding apparatus 201 and the reading apparatus 202 function as a document reading apparatus.

Document reading modes include a first reading mode and a second reading mode. The first reading mode is a mode in which the illumination system 209 and an optical system fixed to predetermined positions read the image of a document to be conveyed. The second reading mode is a mode in which the moving illumination system 209 and the optical system read the image of a document placed on the document positioning glass plate 214 of the reading apparatus 202. Normally, the image of a sheet-like document is read in the first reading mode, and the image of a bound document such as a book or a booklet is read in the second reading mode.

The image printing apparatus 301 includes a sheet storage tray 9 for storing recording media. A recording medium refers to a medium on which an image is formed by an image forming apparatus. Recording media include paper, resin sheets, cloths, overhead projector (OHP) sheets, and labels.

Recording media stored in the sheet storage tray 9 are sent out by a pickup roller 10 and then conveyed to a registration roller 14 by the conveyance rollers 11, 12, and 13.

Image signals output from the reading apparatus 202 are input to light scanning units 3Y, 3M, 3C, and 3K for respective color components each of which includes a semiconductor laser unit and a polygon mirror. More specifically, the image signals for yellow, magenta, cyan, and black output from the reading apparatus 202 are input to the light scanning units 3Y, 3M, 3C, and 3K, respectively. The following describes a configuration for forming a yellow image, and a similar configuration is also applicable to magenta, cyan, and black images.

The outer circumferential surface of a photosensitive drum 1Y is charged by a charging unit 2Y. After the outer circumferential surface of the photosensitive drum 1Y is charged, the outer circumferential surface of the photosensitive drum 1Y is irradiated with laser light according to an image signal (input to the light scanning unit 3Y from the reading apparatus 202) from the light scanning unit 3Y via an optical system such as a polygon mirror. As a result, an electrostatic latent image is formed on the outer circumferential surface of the photosensitive drum 1Y.

Subsequently, the electrostatic latent image is developed with toner of a developing unit 4Y, and a toner image is formed on the outer circumferential surface of the photosensitive drum 1Y. The toner image formed on the photosensitive drum 1Y is transferred to a transfer belt 6 by a transfer roller 5Y disposed at the position facing the photosensitive drum 1Y.

The yellow, magenta, cyan, and black toner images transferred onto the transfer belt 6 are then transferred onto a recording medium by a transfer roller pair 15. In synchronization with the transfer timing, the registration roller 14 sends the recording medium to the transfer roller pair 15.

As described above, the recording medium with a toner image transferred thereon is sent to a fixing unit 18 and then heated and pressurized by the fixing unit 18. Then, the toner image is fixed onto the recording medium. An image is formed on a recording medium by the image forming apparatus 100 in this way. The recording medium with an image formed thereon is discharged onto a discharge tray 19 by a discharge roller 17.

The image forming apparatus 100 according to the present embodiment includes a door 20 used by a user to remove a sheet remaining in the conveyance path. By opening the door 20, the user can remove the sheet remaining in the conveyance path. The image forming apparatus 100 according to the present embodiment includes a door sensor 21 for detecting the opening and closing of the door 20.

This completes descriptions of the configuration and functions of the image forming apparatus 100.

Figure 2:
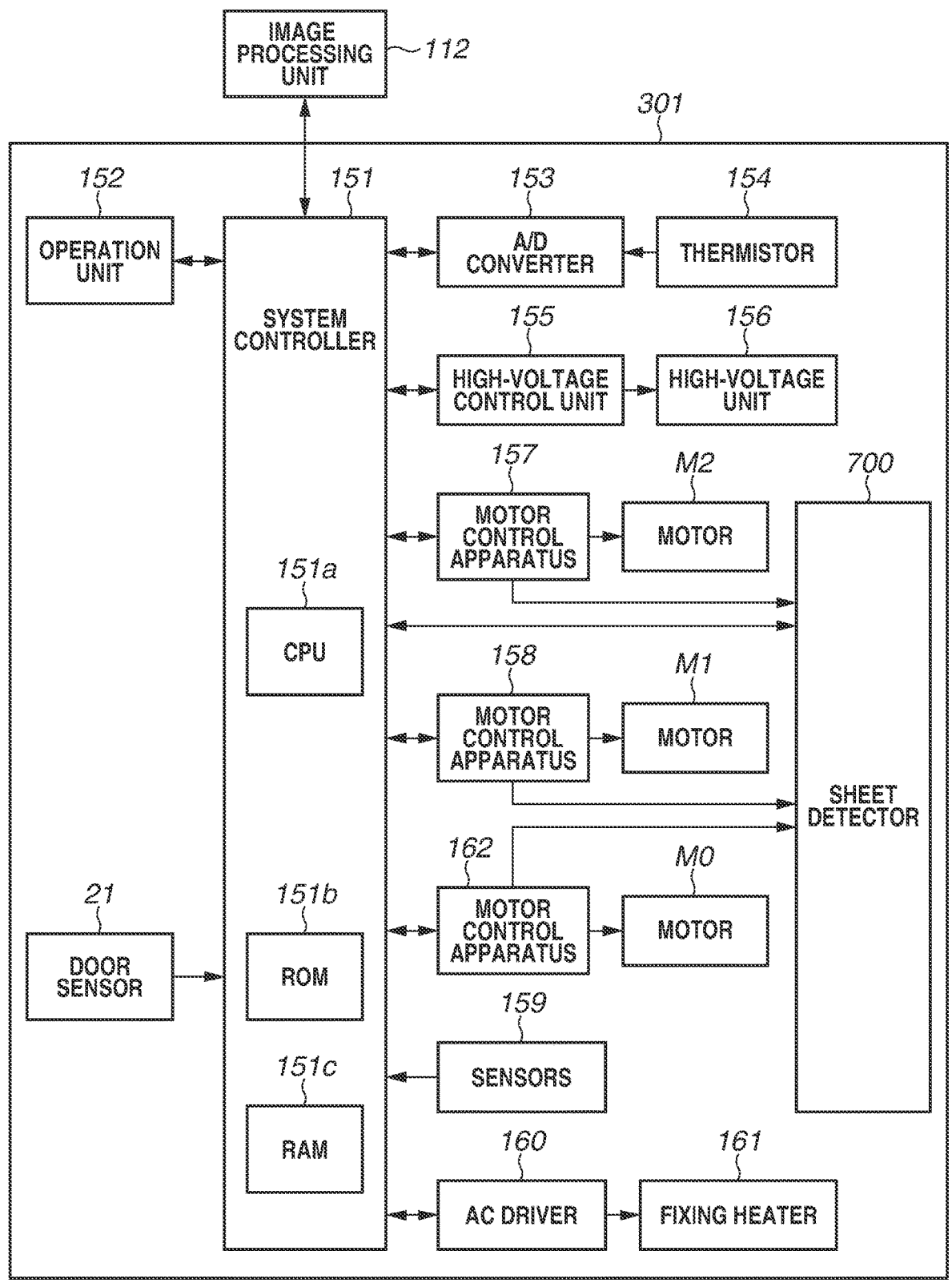
FIG. 2 is a block diagram illustrating a control configuration of the image forming apparatus according to the first embodiment.

FIG. 2 is a block diagram illustrating an example of a control configuration of the image forming apparatus 100. As illustrated in FIG. 2, a system controller 151 includes a central processing unit (CPU) 151a, a read only memory (ROM) 151b, and a random access memory (RAM) 151c. The system controller 151 is connected with the image processing unit 112, an operation unit 152, an analog-to-digital (A/D) converter 153, a high-voltage control unit 155, motor control apparatuses 157, 158, and 162, sensors 159, an alternating current (AC) driver 160, a sheet detector 700, and the door sensor 21. The system controller 151 can transmit and receive data and commands to/from each connected unit.

The CPU 151a performs various sequences related to a predetermined image forming sequence by reading and executing various programs stored in the ROM 151b.

The RAM 151c as a memory device stores various kinds of data such as setting values for the high-voltage control unit 155, command values for the motor control apparatus 157, and information received from the operation unit 152.

The system controller 151 transmits to the image processing unit 112 setting value data for various units provided in the image forming apparatus 100 required for image processing in the image processing unit 112. The system controller 151 also receives signals from the sensors 159 and sets the setting values for the high-voltage control unit 155 based on the received signals.

The high-voltage control unit 155 supplies voltages required for the high voltage unit 156 (the charging units 2Y, 2M, 2C, and 2K, and the developing units 4Y, 4M, 4C, and 4K) according to the setting values set by the system controller 151.

The motor control apparatus 157 controls a motor (stepping motor) M2 for driving the conveyance roller 13 according to an instruction output from the CPU 151a. The motor control apparatus 158 controls a motor (stepping motor) M1 for driving the conveyance roller 12 according to an instruction output from the CPU 151a. The motor control apparatus 162 controls a motor (stepping motor) M0 for driving the conveyance roller 11 according to an instruction output from the CPU 151a. Although only the motors M0, M1, and M2 are illustrated in FIG. 2 as motors of the image forming apparatus 100, four or more motors are actually provided in the image forming apparatus 100. One motor control apparatus may be configured to control a plurality of motors. Although three motor control apparatuses are illustrated in FIG. 2, four or more motor control apparatuses are provided in the image forming apparatus 100.

The A/D converter 153 receives a detection signal detected by a thermistor 154 for detecting the temperature of a fixing heater 161, converts the detection signal as an analog signal into a digital signal, and transmits the digital signal to the system controller 151. The system controller 151 controls the AC driver 160 based on the digital signal received from the A/D converter 153. The AC driver 160 controls the temperature of the fixing heater 161 to become the temperature required to perform fixing processing. The fixing heater 161 used for fixing processing is included in the fixing unit 18.

The system controller 151 controls the operation unit 152 to display an operation screen used by the user to set the recording medium type to be used (hereinafter referred to as a paper type), at the display unit disposed in the operation unit 152. The system controller 151 receives from the operation unit 152 information set by the user, and controls operation sequences of the image forming apparatus 100 based on the information set by the user. The system controller 151 transmits information indicating the state of the image forming apparatus 100 to the operation unit 152. The information indicating the state of the image forming apparatus 100 includes information about the number of sheets with an image formed thereon, progress of image forming operations, sheet jam and double feed in the document reading apparatus 201 and the image printing apparatus 301, and a sheet remaining in the conveyance path. The operation unit 152 displays information received from the system controller 151 at the display unit.

As described above, the system controller 151 controls operation sequences of the image forming apparatus 100. The sheet detector 700 will be described below.

[Motor Control Apparatus]

A motor control apparatus according to the present embodiment will be described below. The motor control apparatus according to the present embodiment controls a motor based on vector control. In the following descriptions, control is performed based on the rotational phase θ, the instructed phase θ_ref, and the current phase as electrical angles. However, for example, the electrical angles may be converted into mechanical angles, and the following control may be performed based on the mechanical angles.

<Vector Control>

Vector control performed by the motor control apparatus 157 according to the present embodiment will be described below with reference to FIGS. 3 and 4. The configuration of the motor control apparatuses 158 and 162 is similar to the configuration of the motor control apparatus 157, and descriptions thereof will be omitted. In the following descriptions, a motor is not provided with a sensor such as a rotary encoder for detecting the rotational phase of the rotor of the motor. However, the motor may be provided with a sensor such as a rotary encoder.

Figure 3:
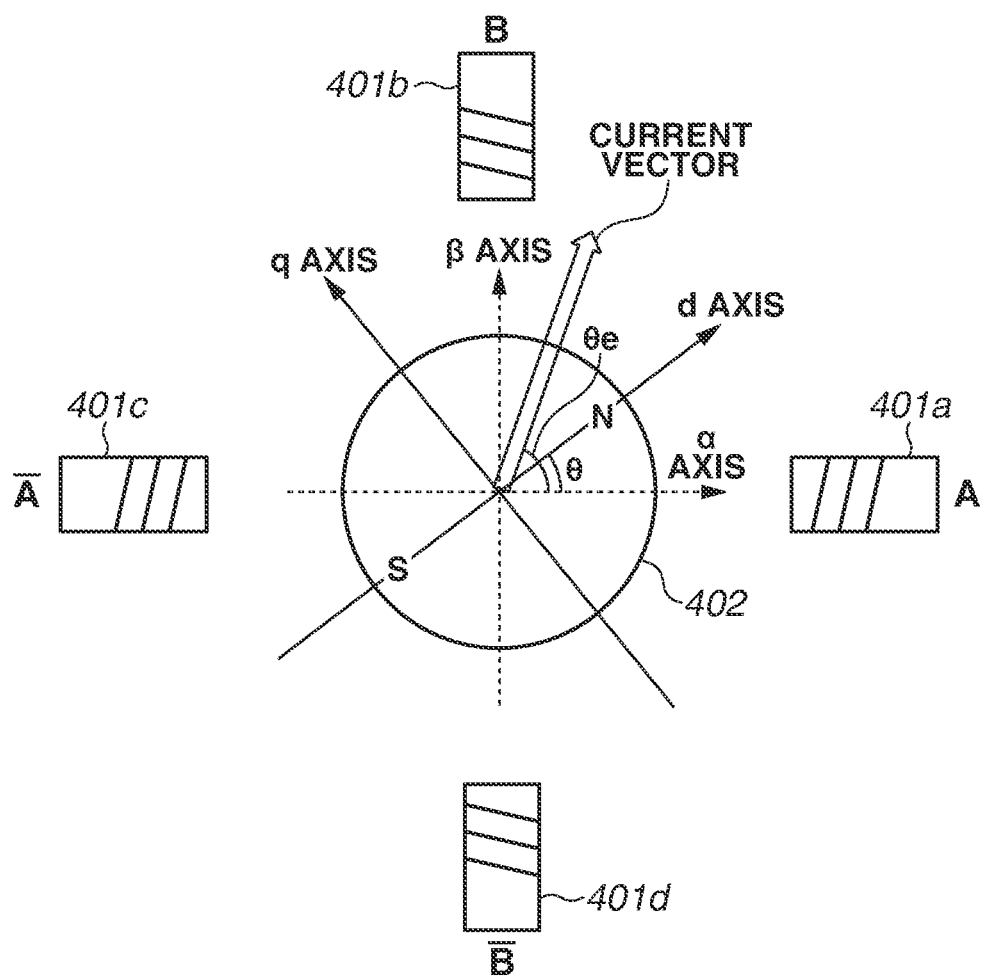
FIG. 3 illustrates a relation between a 2-phase motor having phases A and B and a rotating coordinate system represented by the d and q axes.

FIG. 3 illustrates a relation between a 2-phase stepping motor (hereinafter referred to as a motor) M2 using phase A (first phase) and phase B (second phase) and a rotating coordinate system represented by the d and q axes. Referring to FIG. 3, in the stationary coordinate system, the α axis corresponding to the winding of phase A and the β axis corresponding to the winding of phase B are defined. The d axis is defined along the direction of the magnetic flux made by the magnetic pole of the permanent magnet used for a rotor 402. The q axis is defined along the direction (direction perpendicularly intersecting with the d axis) which leads the d axis by 90 degrees in the counterclockwise direction. The angle formed between the α and d axes is defined as θ, and the rotational phase of the rotor 402 is represented by the angle θ. In vector control, a rotating coordinate system based on the rotational phase θ of the rotor 402 is used. More specifically, in vector control, two current components in the rotating coordinate system are used to represent a current vector corresponding to the drive current flowing in the winding. The two current components include the q-axis component (torque current component) for generating torque in the rotor and the d-axis component (exciting current component) affecting the intensity of the magnetic flux passing through the winding.

Vector control refers to a method for controlling a motor by performing phase feedback control to control the values of the torque current component and the exciting current component to reduce the deviation between the instructed phase representing the target phase of the rotor and the actual rotational phase. There is also a method for controlling a motor by performing speed feedback control to control the values of the torque current component and the exciting current component to reduce the deviation between the instructed speed representing the target seed of the rotor and the actual rotational speed.

Figure 4:
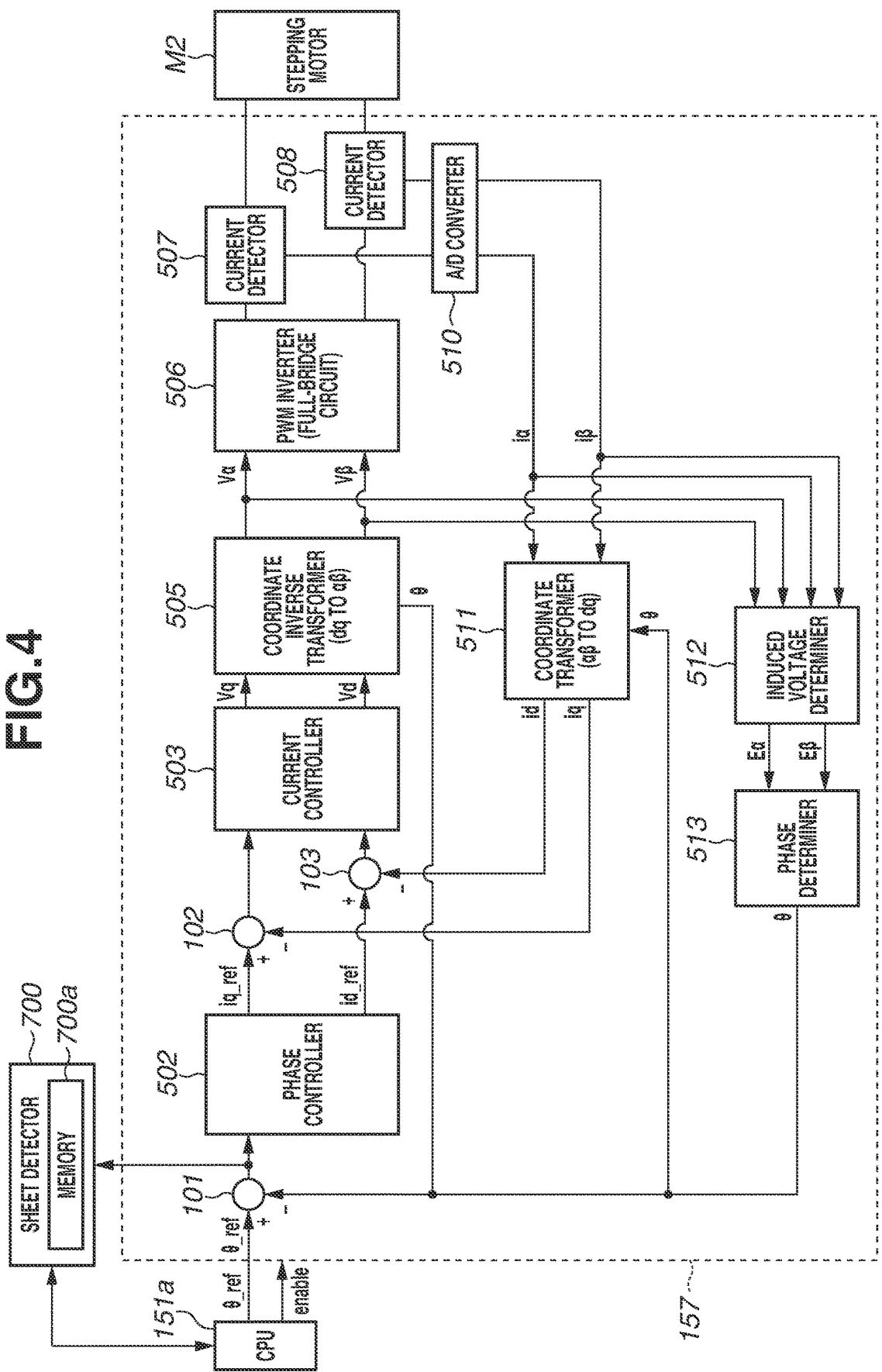
FIG. 4 is a block diagram illustrating a configuration of a motor control apparatus according to the first embodiment.

FIG. 4 is a block diagram illustrating an example of a configuration of the motor control apparatus 157 for controlling the motor M2. The motor control apparatus 157 includes at least one ASIC and performs the following functions.

As illustrated in FIG. 4, the motor control apparatus 157 includes, as circuits for performing vector control, a phase controller 502, a current controller 503, a coordinate inverse transformer 505, a coordinate transformer 511, and a pulse width modulation (PWM) inverter 506 for supplying a drive current to the winding of the motor. The coordinate transformer 511 performs coordinate conversion on the current vectors corresponding to the drive currents flowing in the windings of phases A and B of the motor 509 from the stationary coordinate system represented by the α and β axes into the rotating coordinate system represented by the q and d axes. As a result, the drive currents flowing in the windings are represented by the current value of the q-axis component (q-axis current) and the current value of the d-axis component (d-axis current) which are current values in the rotating coordinate system. The q-axis current is equivalent to the torque current for generating torque in the rotor 402 of the motor M2. The d-axis current is equivalent to the exciting current affecting the intensity of the magnetic flux passing through the windings of the motor M2. The motor control apparatus 157 can independently control the q-axis current and the d-axis current. As a result, the motor control apparatus 157 can efficiently generate torque required for the rotation of the rotor 402, by controlling the q-axis current according to the load torque applied to the rotor 402. More specifically, in vector control, the magnitude of the current vector in FIG. 3 changes according to the load torque applied to the rotor 402.

The motor control apparatus 157 determines the rotational phase θ of the rotor 402 of the motor M2 by using a method (described below) and performs vector control based on the determination result. The CPU 151a generates the instructed phase θ_ref representing the target phase of the rotor 402 of the motor M2 and outputs the instructed phase θ_ref to the motor control apparatus 157. The instructed phase θ_ref is set based on the target speed of the rotor of the motor M2 corresponding to the target speed of the circumferential speed of the conveyance roller 13.

The subtractor 101 calculates and outputs the deviation Δθ between the rotational phase θ of the rotor 402 of the motor M2 output from a phase determiner 513 and the instructed phase θ_ref.

The phase controller 502 acquires the deviation Δθ at intervals of time T (for example, 200 μs). The phase controller 502 generates and outputs a q-axis current instructed value iq_ref and a d-axis current instructed value id_ref to reduce the deviation Δθ acquired from the subtractor 101, based on proportional (P) control, integral (I) control, and differential (D) control. More specifically, the phase controller 502 generates and outputs the q-axis current instructed value iq_ref and the d-axis current instructed value id_ref to become the deviation output from the subtractor 101 to 0 based on P control, I control, and D control. P control refers to a method for controlling the control target value based on a value proportional to the deviation between a instructed value and an estimated value. I control refers to a method for controlling the control target value based on a value proportional to the time integration of the deviation between a instructed value and an estimated value. D control refers to a method for controlling the control target value based on a value proportional to the time change of the deviation between a instructed value and an estimated value. Although, in the present embodiment, the phase controller 502 generates the q-axis current instructed value iq_ref and the d-axis current instructed value id_ref based on proportional-integral-differential (PID) control, the configuration is not limited thereto. For example, the phase controller 502 may generate the q-axis current instructed value iq_ref and the d-axis current instructed value id_ref based on proportional-integral (PI) control. When using a permanent magnet as the rotor 402, normally, the d-axis current instructed value id_ref affecting the intensity of the magnetic flux which passes through the winding is set to 0. However, the configuration is not limited thereto.

The drive currents flowing in the windings of phases A and B of the motor M2 are detected by current detectors 507 and 508, respectively, and then converted from analog values into digital values by the A/D transformer 510. The interval at which the current detectors 507 and 508 detect currents is, for example, an interval equal to or shorter than the interval T at which the phase controller 502 acquires the deviation Δθ (for example, 25 μs).

The current values of the drive currents converted from analog values into digital values by the A/D transformer 510 are represented by the following formulas using the phase θe of the current vector in FIG. 3 as current values iα and iβ in the stationary coordinate system. The phase θe of the current vector is defined as the angle formed between the α axis and the current vector. I denotes the magnitude of the current vector.

$$iα = I*\cos θe \quad (1)$$

$$iβ = I*\sin θe \quad (2)$$

The current values iα and iβ are input to the coordinate transformer 511 and an induced voltage determiner 512.

The coordinate transformer 511 converts the current values iα and iβ in the stationary coordinate system into the current value iq of the q-axis current and the current value id of the d-axis current in the rotating coordinate system, by the following formulas:

$$id = \cos θ*iα + \sin θ*iβ \quad (3)$$

$$iq = -\sin θ*iα + \cos θ*iβ \quad (4)$$

The coordinate transformer 511 outputs the converted current value iq to the subtractor 102 and outputs the converted current value id to the subtractor 103.

The subtractor 102 calculates the deviation between the q-axis current instructed value iq_ref and the current value iq and outputs the deviation to the current controller 503.

The subtractor 103 calculates the deviation between the d-axis current instructed value id_ref and the current value id and outputs the deviation to the current controller 503.

The current controller 503 generates drive voltages Vq and Vd to reduce the input deviations based on PID control. More specifically, the current controller 503 generates the drive voltages Vq and Vd such that the input deviations become 0 and outputs the drive voltages to the coordinate inverse transformer 505. More specifically, the current controller 503 functions as a generation unit. Although, in the present embodiment, the current controller 503 generates the drive voltages Vq and Vd based on PID control, the configuration is not limited thereto. For example, the current controller 503 may generate the drive voltages Vq and Vd based on PI control.

The coordinate inverse transformer 505 performs inverse transform on the drive voltages Vq and Vd in the rotating coordinate system output from the current controller 503 into drive voltages Vα and Vβ in the stationary coordinate system based on the following formulas:

$$Vα = \cos θ*Vd - \sin θ*Vq \quad (5)$$

$$Vβ = \sin θ*Vd + \cos θ*Vq \quad (6)$$

The coordinate inverse transformer 505 outputs the drive voltages Vα and Vβ having undergone inverse transform to the induced voltage determiner 512 and the PWM inverter 506.

The PWM inverter 506 includes a full-bridge circuit (H bridge circuit). The full-bridge circuit is driven by a PWM signal based on the drive voltages Vα and Vβ input from the coordinate inverse transformer 505. As a result, the PWM inverter 506 generates the drive currents iα and iβ according to the drive voltages Vα and Vβ, respectively, and supplies the drive currents iα and iβ to the winding of each phase of the motor M2 to drive the motor M2. More specifically, the PWM inverter 506 functions as a supply unit for supplying a current to the winding of each phase of the motor M2. Although, in the present embodiment, the PWM inverter 506 includes a full-bridge circuit, the PWM inverter 506 may include a half-bridge circuit.

A method for determining the rotational phase θ will be described below. To determine the rotational phase θ of the rotor 402, the values of induced voltages Eα and Eβ induced in the windings of phases A and B of the motor M2 by the rotation of the rotor 402 are used. The values of the induced voltages Eα and Eβ are determined (calculated) by the induced voltage determiner 512. More specifically, the induced voltages Eα and Eβ are determined based on the current values iα and iβ, respectively, input from the A/D transformer 510 to the induced voltage determiner 512 and on the drive voltage Vα and Vβ, respectively, input from the coordinate inverse transformer 505 to the induced voltage determiner 512, by the following formulas:

$$E\alpha = V\alpha - R*i\alpha - L*di\alpha/dt \quad (7)$$

$$E\beta = V\beta - R*i\beta - L*di\beta/dt \quad (8)$$

R denotes the winding resistance and L denotes the winding inductance. The values of the winding resistance R and the winding inductance L are specific to the used motor 509 and are prestored in the ROM 151b or in a memory (not illustrated) included in the motor control apparatus 157.

The induction voltages Eα and Eβ determined by the induced voltage determiner 512 are output to the phase determiner 513.

The phase determiner 513 determines the rotational phase θ of the rotor 402 of the motor 509 based on the ratio between the induced voltages Eα and Eβ output from the induced voltage determiner 512, by using the following formula:

$$\theta = \tan^{-1}(-E\beta/E\alpha) \quad (9)$$

Although, in the present embodiment, the phase determiner 513 determines the rotational phase θ by performing the calculation based on formula (9), the configuration is not limited thereto. For example, the phase determiner 513 may determine the rotational phase θ by referring to a table indicating relations between the induced voltages Eβ and Eα and the rotational phase θ corresponding to the induced voltages Eα and Eβ stored in the ROM 151b.

The rotational phase θ of the rotor 402 obtained as described above is input to the subtractor 101, the coordinate inverse transformer 505, the coordinate transformer 511, and the sheet detector 700.

The motor control apparatus 157 repetitively performs the above-described control.

As described above, according to the present embodiment, the motor control apparatus 157 performs vector control for controlling the current values in the rotating coordinate system to reduce the deviation between the instructed phase θ_ref and the rotational phase θ. This vector control allows preventing a motor from entering the step-out state and preventing motor sound and power consumption from being increased by excess torque.

[Method for Detecting Sheet Remaining in Conveyance Path]

Figure 5:
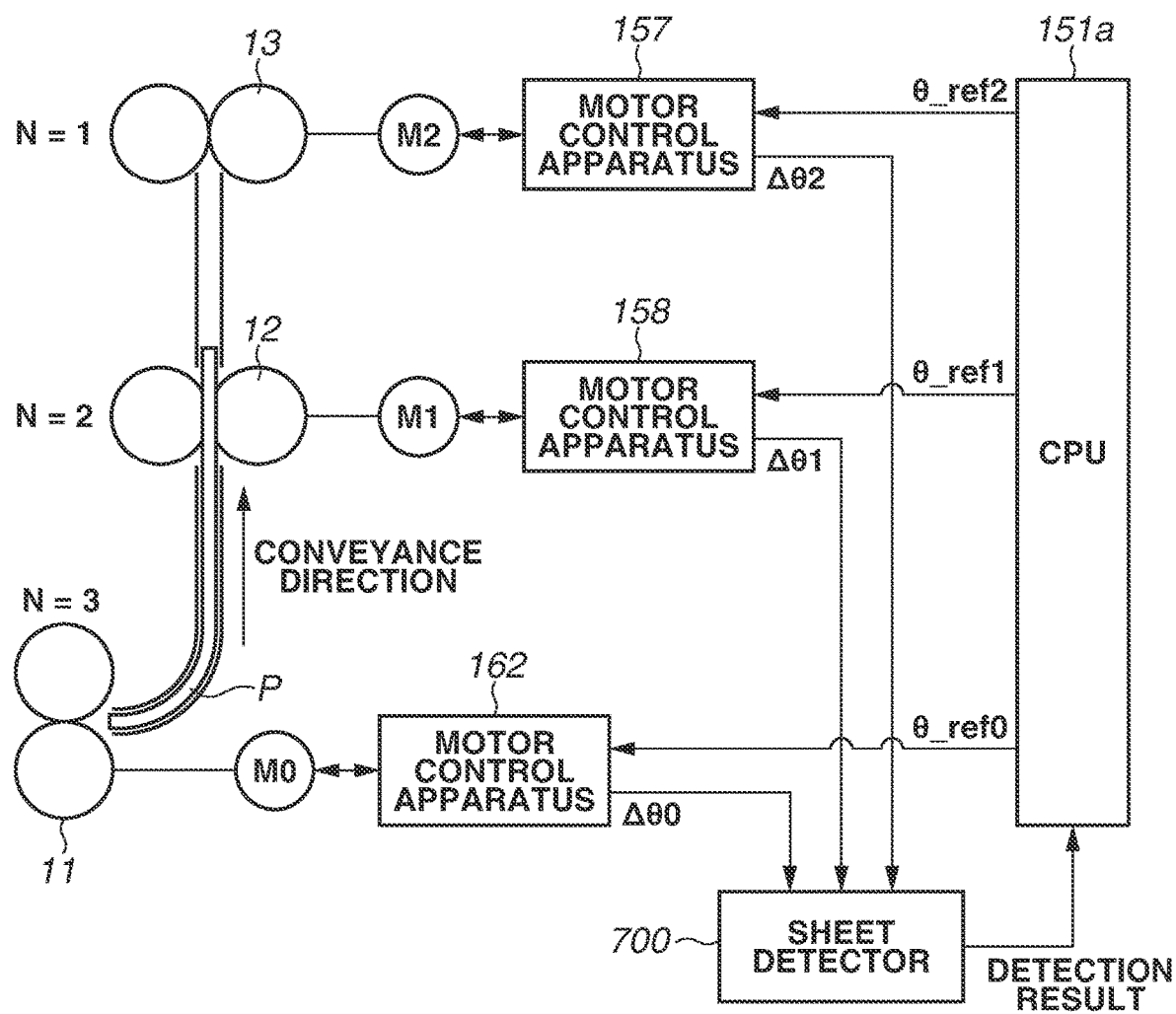
FIG. 5 illustrates a configuration for driving conveyance rollers according to the first embodiment.

FIG. 5 illustrates a configuration for driving conveyance rollers according to the present embodiment. FIG. 5 illustrates a sheet remaining in the conveyance path in a state of being nipped by the conveyance roller 12.

As illustrated in FIG. 5, the conveyance roller 11 is driven by the motor M0 which is controlled by the motor control apparatus 162, the conveyance roller 12 is driven by the motor M1 which is controlled by the motor control apparatus 158, and the conveyance roller 13 is driven by the motor M2 which is controlled by the motor control apparatus 157. The motor control apparatuses 157, 158, and 162 in FIG. 5 control the respective control target motors through vector control.

The following describes a method for detecting a sheet remaining in the conveyance path resulting from the stopped operation of the image forming apparatus 100 according to the present embodiment (a method for detecting the presence or absence of a sheet).

In following descriptions, each of the motor control apparatuses 157, 158, and 162 performs phase feedback control based on the instructed phase θ_ref output from the CPU 151a. The instructed phase θ_ref is generated by the CPU 151a based on the target speed of each motor. Actually, the CPU 151a outputs pulse signals to the motor control apparatuses 157, 158, and 162. The number of pulses corresponds to the instructed phase, and the pulse frequency corresponds to the target speed which is determined based on the target value of the circumferential speed of each roller.

As illustrated in FIG. 5, according to the present embodiment, an integer N indicating the order is set to the conveyance rollers 13, 12, and 11. For example, N=1 denotes the conveyance roller 13 and N=3 denotes the conveyance roller 11.

According to the present embodiment, when the operation of the image forming apparatus 100 is resumed (when power is turned ON), the CPU 151a drives the rollers corresponding to the numbers N and (N+1), and the sheet detector 700 detects the presence or absence of a remaining sheet based on the deviation Δθ for the motor for driving the roller corresponding to the number N. More specifically, according to the present embodiment, the CPU 151a determines the presence or absence of a sheet based not on a sensor such as a photo sensor but on signals output from the motor control apparatuses. For example, each time the sheet detector 700 acquires the deviation Δθ, the sheet detector 700 outputs to the CPU 151a a signal indicating the presence or absence of a sheet as a detection result.

According to the present embodiment, the roller corresponding to the number N is driven at a circumferential speed V1, and the roller corresponding to the number (N+1) is driven at a circumferential speed V2. The circumferential speed V1 is ΔV higher than the circumferential speed V2. More specifically, according to the present embodiment, the roller corresponding to the number N (the roller on the downstream side) is driven at a circumferential speed which is ΔV higher than the circumferential speed of the roller corresponding to the number (N+1) (the roller on the upstream side). The circumferential speed of each roller when detecting the presence or absence of a remaining sheet is lower than the circumferential speed of the roller during sheet conveyance when performing an image forming operation. More specifically, for example, the circumferential speed of each roller when detecting the presence or absence of a remaining sheet is set to a half of the circumferential speed of the roller during sheet conveyance when performing an image forming operation.

Figure 6:
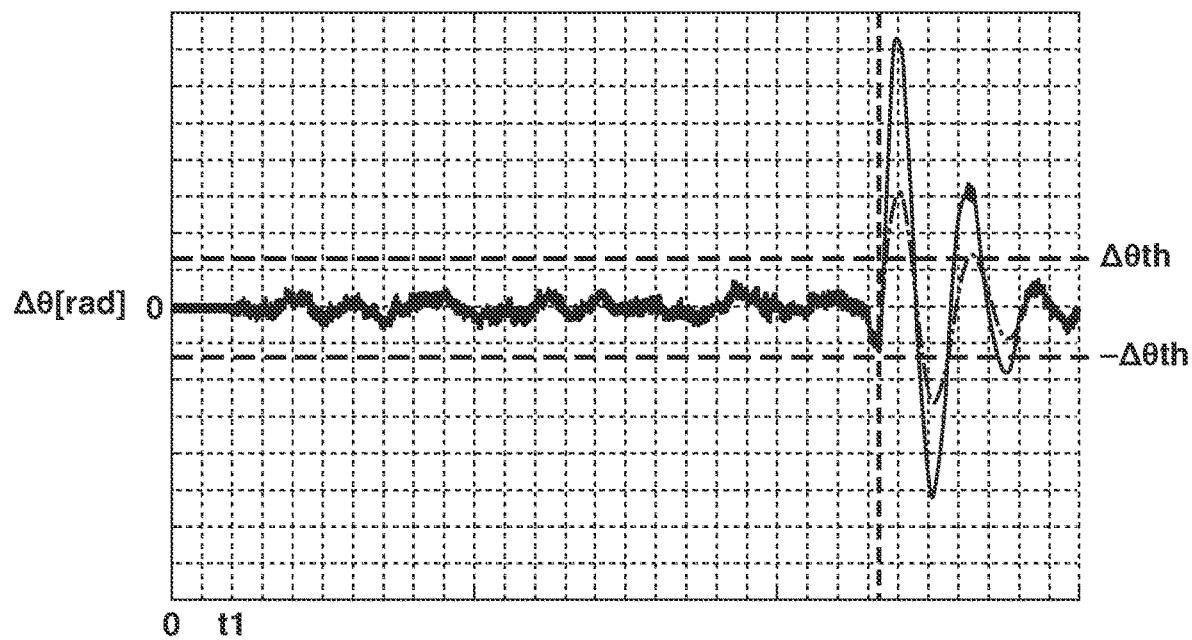
FIG. 6 illustrates an example of a deviation Δθ2 in a case where a sheet remains in a conveyance path in a state of being nipped by a conveyance roller and not being nipped by another conveyance roller according to the first embodiment.

FIG. 6 illustrates an example of a deviation Δθ2 of the motor M2 for driving the conveyance roller 13 when the conveyance rollers 12 and 13 are driven (i.e., N=1) when power of the image forming apparatus 100 is turned ON. At time t1, the drive of the conveyance roller 13 is started. Referring to FIG. 6, the positive value of the deviation Δθ means that the rotational phase θ lags behind the instructed phase θ_ref, and the negative value of the deviation Δθ means that the rotational phase θ leads the instructed phase θ_ref. However, the relation among the polarity of the deviation Δθ, the rotational phase θ, and instructed phase θ_ref is not limited thereto. For example, the deviation Δθ may be a negative value when the rotational phase θ lags behind the instructed phase θ_ref and a positive value when the rotational phase θ leads the instructed phase θ_ref.

When a sheet is conveyed by the conveyance roller 12 in a state of being nipped by the conveyance roller 12 and not being nipped by the conveyance roller 13, the leading edge of the sheet reaches the nip portion of the conveyance roller 13 being driven. In a state where a sheet is not nipped by the conveyance roller 13, the motor M2 for driving the conveyance roller 13 is applied with torque Tr required to drive the conveyance roller 13.

When the sheet starts being conveyed by the conveyance roller 13, the load torque applied to the motor M2 for driving the conveyance roller 13 increases to exceed the torque Tr. If the load torque applied to the motor M2 increases, the rotational phase $\theta$ of the rotor of the motor M2 lags behind the instructed phase $\theta\_ref$, resulting in fluctuations of the absolute value of the deviation $\Delta\theta$. More specifically, for example, the absolute value of the deviation $\Delta\theta$ increases, as illustrated in FIG. 6.

The one-point chain line in FIG. 6 indicates the deviation $\Delta\theta2$ when the conveyance rollers 12 and 13 are driven at the same circumferential speed. The solid line in FIG. 6 indicates the deviation $\Delta\theta2$ when the conveyance roller 13 is driven at a circumferential speed higher than the circumferential speed of the conveyance roller 12 while a sheet is being nipped by both the conveyance rollers 12 and 13.

When a sheet starts being conveyed by both the conveyance rollers 12 and 13, the increased amount of the load torque applied to the motor M2 when the conveyance roller 13 rotates at a circumferential speed higher than the circumferential speed of the conveyance roller 12 is larger than the increased amount when the conveyance roller 13 rotates at a circumferential speed that is the same as the circumferential speed of the conveyance roller 12. This is because, when the conveyance roller 13 rotates at a circumferential speed higher than the circumferential speed of the conveyance roller 12, the conveyance roller 13 pulls the sheet being nipped by the conveyance roller 12, toward the downstream side. The larger the increased amount of the load torque applied to the conveyance roller 13, the larger the increased amount of the absolute value of the deviation $\Delta\theta$. More specifically, as illustrated in FIG. 6, the variation of the deviation $\Delta\theta$ drawn by the solid line is larger than the variation of the deviation $\Delta\theta$ drawn by the one-point chain line. By driving the conveyance roller 13 at a circumferential speed higher than the circumferential speed of the conveyance roller 12, the variation of the deviation $\Delta\theta$ can be increased to allow a remaining sheet to be detected with higher accuracy.

Figure 7:
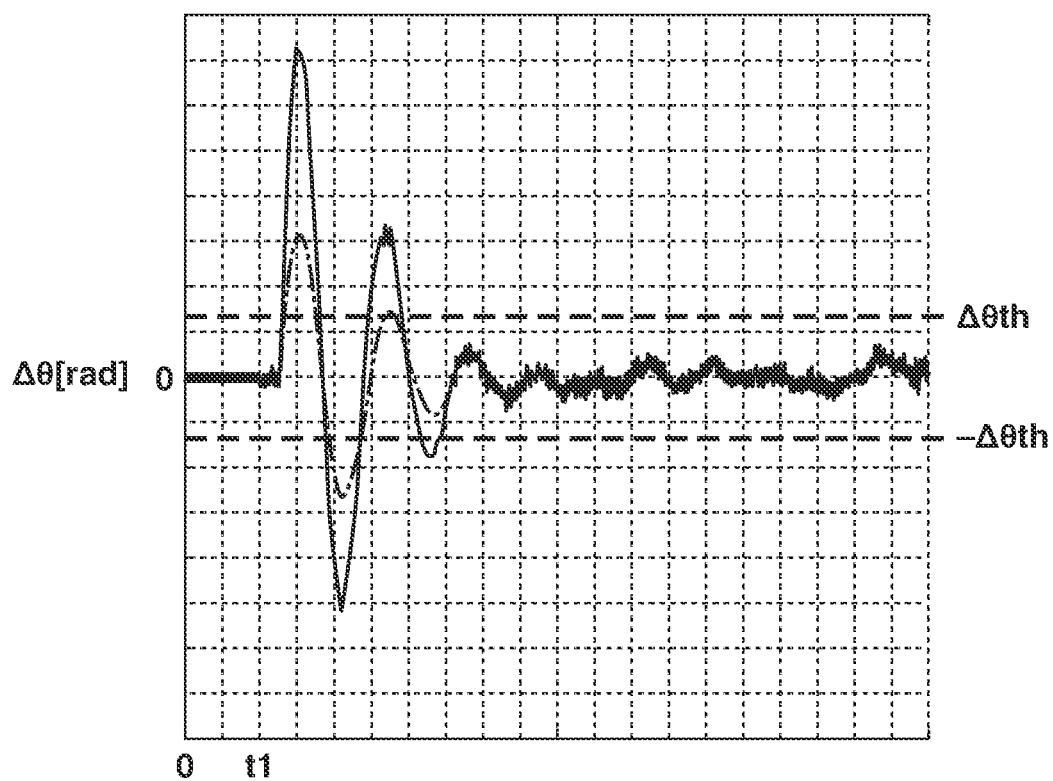
FIG. 7 illustrates an example of the deviation Δθ2 in a case where a sheet remains in the conveyance path in a state of being nipped by both a conveyance roller and another conveyance roller.

For example, when the conveyance rollers 12 and 13 are driven in a case where a sheet remains in the conveyance path in a state of being nipped by both the conveyance rollers 12 and 13, the sheet is conveyed by both the conveyance rollers 12 and 13. At this timing, the conveyance roller 13 is driven at a circumferential speed higher than the circumferential speed of the conveyance roller 12, and accordingly the conveyance roller 13 pulls the sheet being nipped by the conveyance roller 12, toward the downstream side. As a result, the load torque applied to the motor M2 exceeds the torque Tr making it possible to increase the variation of the deviation $\Delta\theta$ to a further extent. More specifically, for example, the deviation $\Delta\theta$ fluctuates as illustrated in FIG. 7. The one-point chain line indicates the deviation $\Delta\theta2$ when the conveyance rollers 12 and 13 are driven at the same circumferential speed, and the solid line indicates the deviation $\Delta\theta2$ when the conveyance roller 13 is driven at a circumferential speed higher than the circumferential speed of the conveyance roller 12. By driving the conveyance roller 13 at a circumferential speed higher than the circumferential speed of the conveyance roller 12, a remaining sheet can be detected with higher accuracy.

As described above, the present embodiment is applicable not only in a case where a sheet remains in the conveyance path in a state of being nipped by the conveyance roller 12 and not being nipped by the conveyance roller 13 but also in a case where a sheet remains in the conveyance path in a state of being nipped by both the conveyance rollers 12 and 13.

As illustrated in FIGS. 6 and 7, according to the present embodiment, a threshold value $\Delta\theta th$ is set as a threshold value of the deviation $\Delta\theta$ for detecting the presence or absence of a sheet. When the absolute value of the acquired deviation $\Delta\theta2$ is the threshold value $\Delta\theta th$ or larger, the sheet detector 700 outputs a signal indicating that the absolute value of the deviation $\Delta\theta2$ is the threshold value $\Delta\theta th$ or larger. When the absolute value of the deviation $\Delta\theta2$ is less than the threshold value $\Delta\theta th$, the sheet detector 700 outputs a signal indicating that the absolute value of the deviation $\Delta\theta2$ is less than the threshold value $\Delta\theta th$.

The threshold value $\Delta\theta th$ is set to a value larger than the maximum absolute value of the deviation $\Delta\theta2$ assumed when the conveyance roller 13 is driven while a sheet is not being nipped by the conveyance roller 13. The maximum absolute value of the deviation $\Delta\theta2$ assumed when the conveyance roller 13 is driven while a sheet is not being nipped by the conveyance roller 13 is predetermined based on a result of measurement performed on an experimental basis.

Then, the threshold value $\Delta\theta th$ is set to a value less than the maximum absolute value of the deviation $\Delta\theta2$ assumed when a sheet starts being conveyed (nipped) by the conveyance roller 13. The maximum absolute value of the deviation $\Delta\theta2$ assumed when a sheet starts being conveyed (nipped) by the conveyance roller 13 is predetermined based on a result of measurement performed on an experimental basis.

More specifically, the absolute value of the deviation $\Delta\theta2$ which is the threshold value $\Delta\theta th$ or larger means a state where a sheet is being nipped at the nip portion of the conveyance roller 13 (a sheet remains in the conveyance path).

Figure 8:
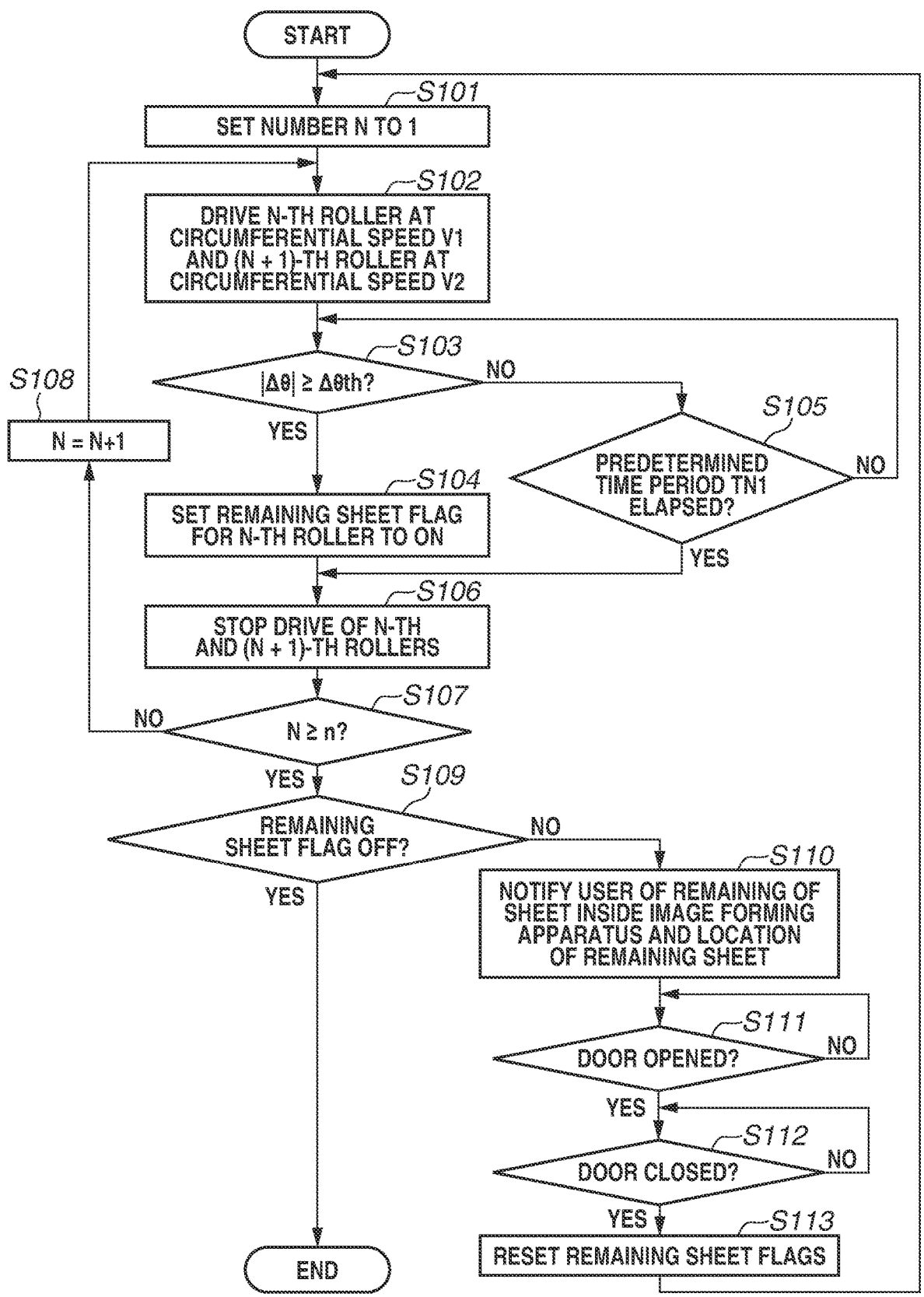
FIG. 8 is a flowchart illustrating a method for detecting a sheet remaining in the conveyance path according to the first embodiment.

FIG. 8 is a flowchart illustrating a method for detecting a sheet remaining in the conveyance path. A method for detecting a sheet remaining in the conveyance path will be described below with reference to FIG. 8. Processing of the flowchart is performed by the CPU 151a. Processing of the flowchart is started, for example, after power of the image forming apparatus 100 is turned ON, i.e., in a state where the image forming processing has not yet been started.

When power of the image forming apparatus 100 is turned ON, then in step S101, the CPU 151a sets the number N to '1'.

In step S102, the CPU 151a outputs an instruction for driving the control target motor to rotate the roller corresponding to the number N at the circumferential speed V1, to the motor control apparatus for controlling the motor for driving the roller corresponding to the number N. The CPU 151a also outputs an instruction for driving the control target motor to rotate the roller corresponding to the number (N+1) at the circumferential speed V2, to the motor control apparatus for controlling the motor for driving the roller corresponding to the number (N+1). As a result, the roller corresponding to the number N is driven at the circumferential speed V1, and the roller corresponding to the number (N+1) is driven at the circumferential speed V2.

When the sheet detector 700 outputs a signal indicating that the absolute value of the deviation $\Delta\theta$ of the motor for driving the N-th roller driven in step S102 is the threshold value $\Delta\theta th$ or larger (YES in step S103), the processing proceeds to step S104. In step S104, the CPU 151a sets the remaining sheet flag for the roller corresponding to the number N to ON. More specifically, the CPU 151a stores information about a sheet being nipped by the roller corresponding to the number N, for example, in the RAM 151c.

On the other hand, when the absolute value of the deviation Δθ of the motor for driving the N-th roller driven in step S102 is less than the threshold value Δθth (NO in step S103), the processing proceeds to step S105.

When a predetermined time period TN1 has not elapsed since the motor was driven in step S102 (NO in step S105), the processing returns to step S103.

On the other hand, when the predetermined time period TN1 has elapsed since the motor was driven in step S102 (YES in step S105), the processing proceeds to step S106. In step S106, the CPU 151a outputs an instruction for stopping the drive of the N-th and the (N+1)-th rollers, to the motor control apparatuses for controlling the motors for driving the N-th and the (N+1)-th rollers. As a result, the drive of the N-th and the (N+1)-th rollers is stopped.

The predetermined time period TN1 is set to a required time period during which a sheet is conveyed over the distance from the nip portion of the (N+1)-th conveyance roller to the nip portion of the N-th conveyance roller by the (N+1)-th conveyance roller rotating at the circumferential speed V2. More specifically, the time period TN1 is set according to the distance from the nip portion of the (N+1)-th conveyance roller to the nip portion of the N-th conveyance roller (more specifically, according to the number N). As described above, according to the present embodiment, when the absolute value of the deviation Δθ becomes the threshold value Δθth or larger before the time period TN1 has elapsed since the drive of the N-th conveyance roller was started, the remaining sheet flag is set to ON, and the drive of the N-th and the (N+1)-th conveyance rollers is stopped even before the time period TN1 has elapsed. When the absolute value of the deviation Δθ does not become the threshold value Δθth or larger before the time period TN1 has elapsed, the drive of the N-th and the (N+1)-th conveyance rollers is also stopped.

When the number N is less than n (NO in step S107), the processing proceeds to step S108. In step S108, the CPU 151a increments N (N=N+1). Then, the processing returns to step S102. n indicates the number of rollers (3 in the present embodiment) ranging from the conveyance roller 13 to the conveyance roller on the most upstream side subjected to the detection of the presence or absence of a sheet in the conveyance direction.

On the other hand, when the number N is n or larger (YES in step S107), the processing proceeds to step S109.

When the remaining sheet flag of any roller is ON (NO in step S109), the processing proceeds to step S110. In step S110, the CPU 151a notifies the user of the remaining of a sheet inside the image forming apparatus 100 and the location of the remaining sheet by displaying these pieces of information at the display unit of the operation unit 152.

When the door sensor 21 detects that the door 20 is opened (YES in step S111), the processing proceeds to step S112.

When the door sensor 21 detects that the door 20 is closed (YES in step S112), the processing proceeds to step S113. In step S113, the CPU 151a resets (turns OFF) the remaining sheet flags corresponding to all of the conveyance rollers. Then, the processing returns to step S101. More specifically, the CPU 151a deletes information about the remaining sheet stored in the RAM 151c.

The CPU 151a repetitively performs the processing of this flowchart until the remaining sheet flags corresponding to all of the conveyance rollers subjected to the detection of the presence or absence of a sheet are set to OFF.

As described above, according to the present embodiment, when the operation of the image forming apparatus 100 is resumed (when power is turned ON), the CPU 151a drives the rollers corresponding to the numbers N and (N+1) and, based on the deviation Δθ for the motor for driving the roller corresponding to the number N, the sheet detector 700 detects the presence or absence of a remaining sheet. The roller corresponding to the number N is driven at the circumferential speed V1, and the roller corresponding to the number (N+1) is driven at the circumferential speed V2 which is ΔV lower than the circumferential speed V1. When the N-th roller is driven at a circumferential speed higher than the circumferential speed of the (N+1)-th roller in this way, the variation of the load torque when a sheet is conveyed to the N-th roller can be increased to allow a remaining sheet to be detected with higher accuracy.

As described above, according to the present embodiment, a sheet remaining in the conveyance path is detected based not on a sensor such as a photo sensor but on signals output from the motor control apparatuses 157, 158, and 162. This allows determination of whether a sheet is being nipped by any conveyance roller (detection of a remaining sheet) without increasing the apparatus size and the cost.

According to the present embodiment, when the absolute value of the deviation Δθ is the threshold value Δθth or larger in step S103 of the flowchart in FIG. 8, then in step S106, the drive of the N-th and the (N+1)-th conveyance rollers is stopped. However, the configuration is not limited thereto. For example, when the absolute value of the deviation Δθ is the threshold value Δθth or larger, the drive of the N-th conveyance roller may be stopped and the drive of the (N+1)-th conveyance roller may be continued.

According to the present embodiment, if a state where the absolute value of the deviation Δθ is less than the threshold value Δθth continues for the predetermined time period TN1, then in step S106 of the flowchart in FIG. 8, the drive of the N-th and the (N+1)-th conveyance rollers is stopped. However, the configuration is not limited thereto. For example, even if a state where the absolute value of the deviation Δθ is less than the threshold value Δθth continues for the predetermined time period TN1, the drive of the N-th and the (N+1)-th conveyance rollers may be continued.

Figure 9:
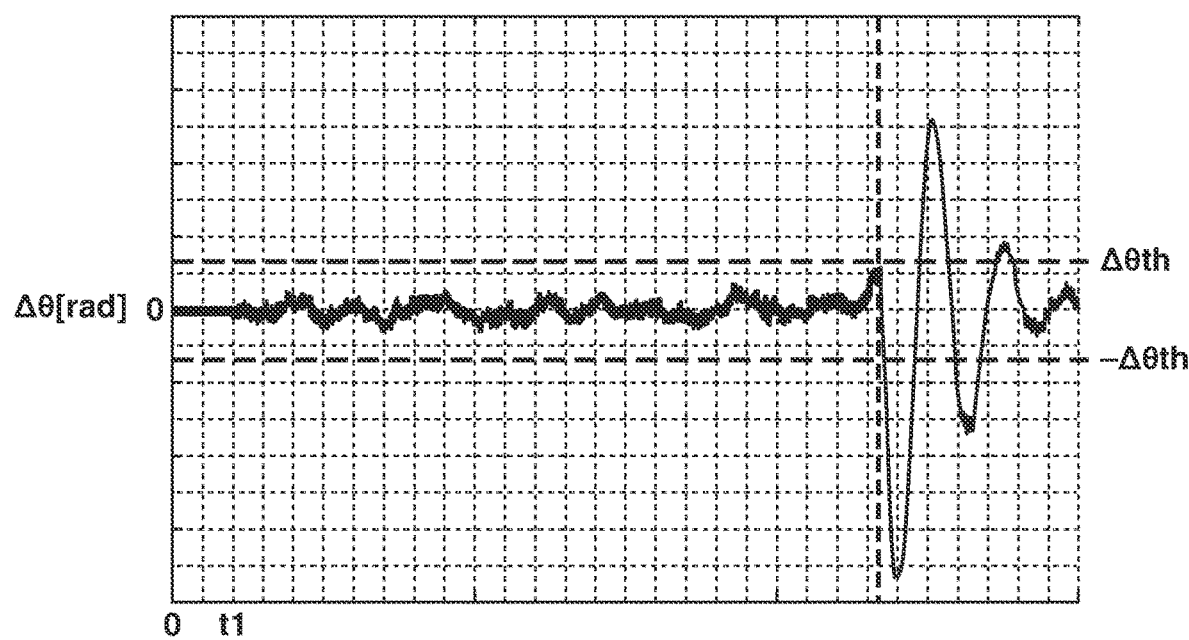
FIG. 9 illustrates an example of a deviation Δθ1 according to the first embodiment.

Although, in the present embodiment, the presence or absence of a remaining sheet is detected based on the deviation Δθ for the motor for driving the roller corresponding to the number N, the configuration is not limited thereto. For example, the presence or absence of a remaining sheet may be detected based on the deviation Δθ for the motor for driving the roller corresponding to the number (N+1). When the leading edge of a sheet conveyed by the conveyance roller 12 rotating at the circumferential speed V2 reaches the conveyance roller 13 rotating at the circumferential speed V1, the load torque applied to the motor M1 for driving the conveyance roller 12 decreases. This is because, when the sheet nipped by the conveyance roller 12 is pulled by the conveyance roller 13, a force in the rotational direction acts on the conveyance roller 12. As a result, the rotational phase θ of the rotor of the motor M1 leads the instructed phase θ_ref, and accordingly the absolute value of the deviation Δθ increases. More specifically, for example, the deviation Δθ fluctuates as illustrated in FIG. 9.

According to the present embodiment, regardless of whether the absolute value of the deviation Δθ becomes the threshold value Δθth or larger in step S103 of the flowchart in FIG. 8, the number N is set to N=N+1 in step S108 when N is less than n. More specifically, when the conveyance rollers 12 and 13 are driven (i.e., N=1), the number N is set in step S108 such that the conveyance rollers 11 and 12 are driven. However, the configuration is not limited thereto. For example, when the absolute value of the deviation Δθ is the threshold value Δθth or larger in step S103, the number N may be set to N=N+2.

More specifically, when the absolute value of the deviation Δθ is the threshold value Δθth or larger while the conveyance rollers 12 and 13 are being driven (i.e., N=1), the number N may be set such that the conveyance roller 11 and the pickup roller 10 are driven. The number N may be set to N=N+3 when n is 4 or larger.

Although, in the present embodiment, the roller corresponding to the number N (the roller on the downstream side) is driven at a circumferential speed which is ΔV higher than the circumferential speed of the roller corresponding to the number (N+1) (the roller on the upstream side), the configuration is not limited thereto. For example, the roller corresponding to the number N (the roller on the downstream side) may be driven at a circumferential speed which is ΔV lower than the circumferential speed of the roller corresponding to the number (N+1) (the roller on the upstream side).

Although, in the present embodiment, the circumferential speed difference ΔV is set to a predetermined value regardless of the paper type of the sheet to be conveyed, the configuration is not limited thereto. For example, the circumferential speed difference ΔV may be set according to the paper type set by the user. The circumferential speed difference ΔV corresponding to thick paper may be less than the circumferential speed difference ΔV corresponding to thin paper and the circumferential speed difference ΔV corresponding to plain paper. The circumferential speed difference ΔV corresponding to plain paper may be less than the circumferential speed difference ΔV corresponding to thin paper.

A second embodiment will be described below. For configurations of the image forming apparatus 100 and the motor control apparatuses 157, 158, and 162 similar to configurations according to the first embodiment, descriptions will be omitted.

According to the first embodiment, the roller corresponding to the number N is driven at the circumferential speed V1, and the roller corresponding to the number (N+1) is driven at the circumferential speed V2. The presence or absence of a remaining sheet is detected based on the deviation Δθ for the motor for driving the roller corresponding to the number N. According to the present embodiment, when the operation of the image forming apparatus 100 is resumed (when power is turned ON), the rollers are driven one by one from the roller corresponding to the number N. More specifically, while the roller on the upstream side is not being driven and the roller on the downstream side is being driven out of two adjacent conveyance rollers, the sheet detector 700 detects the presence or absence of a sheet based on the deviation Δθ for the motor for driving the conveyance roller on the downstream side. The circumferential speed of each roller when detecting the presence or absence of a remaining sheet is lower than the circumferential speed of the roller during sheet conveyance when performing an image forming operation. More specifically, for example, the circumferential speed of each roller when detecting the presence or absence of a remaining sheet is set to a half of the circumferential speed of the roller during sheet conveyance when performing an image forming operation.

Figure 10:
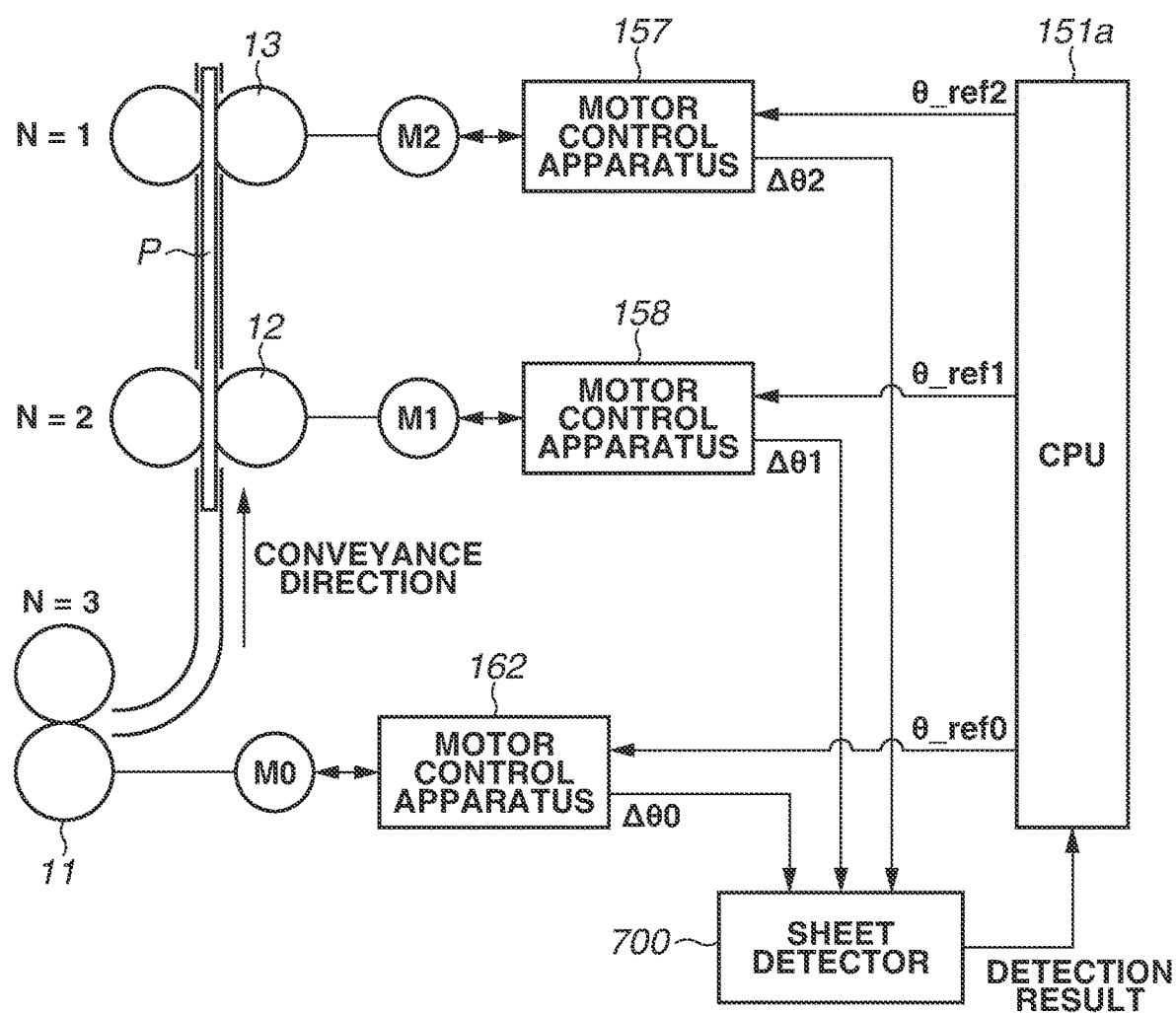
FIG. 10 illustrates a configuration for driving conveyance rollers according to a second embodiment.

FIG. 10 illustrates a configuration in which the conveyance rollers according to the present embodiment are driven. FIG. 10 illustrates a sheet remaining in the conveyance path in a state of being nipped by both the conveyance rollers 12 and 13.

The following describes a method for detecting a sheet remaining in the conveyance path resulting from the stopped operation of the image forming apparatus 100 according to the present embodiment (a method for detecting the presence or absence of a sheet).

When the conveyance roller 13 is driven while neither the conveyance roller 12 nor the conveyance roller 13 nips a sheet, the motor M2 is applied with the torque Tr required to drive the conveyance roller 13.

If the conveyance roller 12 is not driven and the conveyance roller 13 is driven while a sheet remains in the conveyance path in a state of being nipped by both the conveyance rollers 12 and 13, the conveyance roller 13 pulls the sheet being nipped by the conveyance roller 12, toward the downstream side. As a result, the motor M2 is applied with the torque Tr and torque Tp required to pull the sheet toward the downstream side. The motor M2 is applied with not only the torque Tr but also the torque Tp, and accordingly the absolute value of the deviation Δθ increases. More specifically, the absolute value of the deviation Δθ fluctuates, as indicated by the solid line or one-point chain line in FIG. 7. The variation of the absolute value of the deviation Δθ is not necessarily the same as the variation of the absolute value of the deviation Δθ when the conveyance rollers 12 and 13 are driven while a sheet remains in the conveyance path in a state of being nipped by both the conveyance rollers 12 and 13.

According to the present embodiment, a threshold value Δθth2 is set as a threshold value of the deviation Δθ for detecting the presence or absence of a sheet. If the absolute value of the acquired deviation Δθ is the threshold value Δθth2 or larger, the sheet detector 700 outputs a signal indicating that the absolute value of the deviation Δθ is the threshold value Δθth2 or larger. If the absolute value of the deviation Δθ is less than the threshold value Δθth2, the sheet detector 700 outputs a signal indicating that the absolute value of the deviation Δθ is less than the threshold value Δθth2.

For example, the threshold value Δθth2 is set to a value larger than the maximum value of the deviation Δθ assumed when the conveyance roller 13 is driven while a sheet is not being nipped by the conveyance roller 13. The maximum value of the deviation Δθ assumed when the conveyance roller 13 is driven while a sheet is not being nipped by the conveyance roller 13 is predetermined based on a result of measurement performed on an experimental basis.

The threshold value Δθth2 is set to a value less than the maximum value of the deviation Δθ assumed when the conveyance roller 13 is driven while a sheet is being nipped by both the conveyance rollers 12 and 13. The maximum value of the deviation Δθ assumed when the conveyance roller 13 is driven while a sheet is being nipped by both the conveyance rollers 12 and 13 is predetermined based on a result of measurement performed on an experimental basis.

More specifically, the absolute value of the deviation Δθ which is the threshold value Δθth2 or larger means a state where a sheet is being nipped by the conveyance roller 13 (a sheet remains in the conveyance path).

Figure 11:
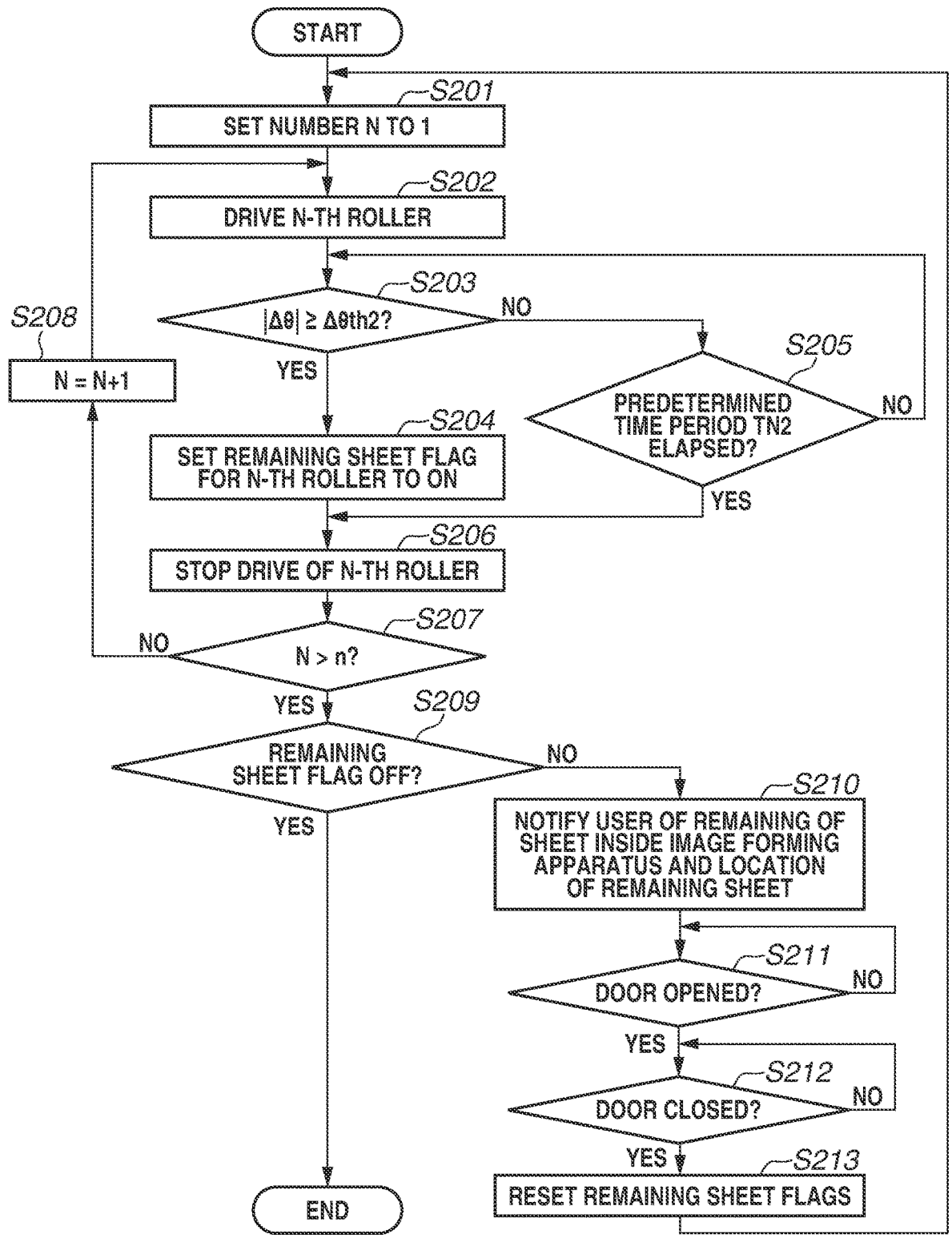
FIG. 11 is a flowchart illustrating a method for detecting a sheet remaining in the conveyance path according to the second embodiment.

FIG. 11 is a flowchart illustrating a method for detecting a sheet remaining in the conveyance path. A method for detecting a sheet remaining in the conveyance path will be described below with reference to FIG. 11. Processing of the flowchart is performed by the CPU 151a. Processing of the flowchart is started, for example, after power of the image forming apparatus 100 is turned ON, i.e., in a state where the image forming processing has not yet been started.

When power of the image forming apparatus 100 is turned ON, then in step S201, the CPU 151a sets the number N to '1'.

In step S202, the CPU 151a outputs an instruction for driving the control target motor to the motor control apparatus for controlling the motor for driving the roller corresponding to the number N. As a result, the roller corresponding to the number N is driven.

When the sheet detector 700 outputs a signal indicating that the absolute value of the deviation $\Delta\theta$ of the motor for driving the N-th roller driven in step S202 is the threshold value $\Delta\theta th2$ or larger (YES in step S203), the processing proceeds to step S204. In step S204, the CPU 151a sets the remaining sheet flag for the roller corresponding to the number N to ON. More specifically, the CPU 151a stores information about a sheet being nipped by the roller corresponding to the number N, for example, in the RAM 151c.

On the other hand, when the absolute value of the deviation $\Delta\theta$ of the motor for driving the N-th roller driven in step S202 is less than the threshold value $\Delta\theta th2$ (NO in step S203), the processing proceeds to step S205.

When a predetermined time period TN2 has not elapsed since the motor was driven in step S202 (NO in step S205), the processing returns to step S203.

On the other hand, when the predetermined time period TN2 has elapsed since the motor was driven in step S202 (YES in step S205), the processing proceeds to step S206. In step S206, the CPU 151a outputs an instruction for stopping the drive of the N-th roller to the motor control apparatus for controlling the motor for driving the N-th roller. As a result, the drive of the N-th roller is stopped.

The predetermined time period TN2 is set to a required time period during which a sheet is conveyed over the distance from the nip portion of the N-th conveyance roller to the nip portion of the (N−1)-th conveyance roller (i.e., the conveyance roller on the downstream side of the N-th conveyance roller) by the N-th conveyance roller. More specifically, the time period TN2 is set according to the distance from the nip portion of the N-th conveyance roller to the nip portion of the (N−1)-th conveyance roller (i.e., according to the number N). As a result, even while a sheet is being nipped by the N-th conveyance roller and not being nipped by the (N+1)-th conveyance roller, the leading edge of the sheet conveyed by the N-th conveyance roller reaches the nip portion of the (N−1)-th conveyance roller in a stop state. When the leading edge of the sheet reaches the nip portion of the (N−1)-th conveyance roller in a stop state, the sheet bends between the N-th and the (N−1)-th conveyance rollers. As a result, an elastic force acts on the sheet. The elastic force causes a force acting on the N-th conveyance roller in the direction opposite to the rotational direction of the roller. This results in an increase in the load torque applied to the motor for driving the N-th conveyance roller and also an increase in the absolute value of the deviation $\Delta\theta$. This configuration allows detecting a remaining sheet based on the increasing deviation $\Delta\theta$.

As described above, according to the present embodiment, when the absolute value of the deviation $\Delta\theta$ becomes the threshold value $\Delta\theta th$ or larger before the time period TN2 has elapsed since the drive of the N-th conveyance roller was started, the remaining sheet flag is set to ON, and the drive of the N-th conveyance roller is stopped even before the time period TN2 has elapsed. If the absolute value of the deviation $\Delta\theta$ does not become the threshold value $\Delta\theta th$ or larger before the time period TN2 has elapsed, the drive of the N-th conveyance roller is stopped.

When the number N is n or less (NO in step S207), then in step S208, the CPU 151a sets N to N=N+1. Then, the processing returns to step S202. n indicates the number of rollers (3 in the present embodiment) from the conveyance roller 13 to the conveyance roller on the most upstream side subjected to the detection of the presence or absence of a sheet in the conveyance direction.

On the other hand, when the number N is larger than n (YES in step S207), the processing proceeds to step S209.

Processing from step S209 to step S213 is similar to the processing from step S109 to step S113 in FIG. 8, and descriptions thereof will be omitted.

As described above, according to the present embodiment, when the operation of the image forming apparatus 100 is resumed (when power is turned ON), the rollers are driven one by one from the roller corresponding to the number N. The sheet detector 700 detects the presence or absence of a remaining sheet based on the deviation $\Delta\theta$ for the motor for driving one roller. More specifically, while the roller more on the upstream side is not being driven and the roller more on the downstream side is being driven out of two adjacent conveyance rollers, the sheet detector 700 detects the presence or absence of a sheet based on the deviation $\Delta\theta$ for the motor for driving the conveyance roller on the downstream side. As a result, it is possible to increase the increased amount of the absolute value of the deviation $\Delta\theta$ which increases when the N-th roller pulls the sheet being nipped by the (N+1)-th roller, thus enabling the remaining sheet to be detected with higher accuracy.

As described above, according to the present embodiment, a sheet remaining in the conveyance path is detected based not on a sensor such as a photo sensor but on signals output from the motor control apparatuses. This allows determination of whether a sheet is being nipped by any conveyance roller (detection of a remaining sheet) without increasing the apparatus size and the cost.

According to the present embodiment, regardless of whether the absolute value of the deviation $\Delta\theta$ becomes the threshold value $\Delta\theta th2$ or less in step S203 of the flowchart in FIG. 11, the number N is set to N=N+1 in step S208 when N is less than n. More specifically, when the conveyance roller 13 is driven (i.e., N=1), the number N is set in step S208 such that the conveyance roller 12 is driven. However, the configuration is not limited thereto. For example, when the absolute value of the deviation $\Delta\theta$ is the threshold value $\Delta\theta th2$ or larger in step S203, the number N may be set to N=N+2. More specifically, the number N may be set such that the conveyance roller 11 is driven when the absolute value of the deviation $\Delta\theta$ is the threshold value $\Delta\theta th2$ or larger while the conveyance roller 13 is being driven (i.e., N=1). In addition, the number N may be set to N=N+3 when n is 4 or larger.

Figure 15:
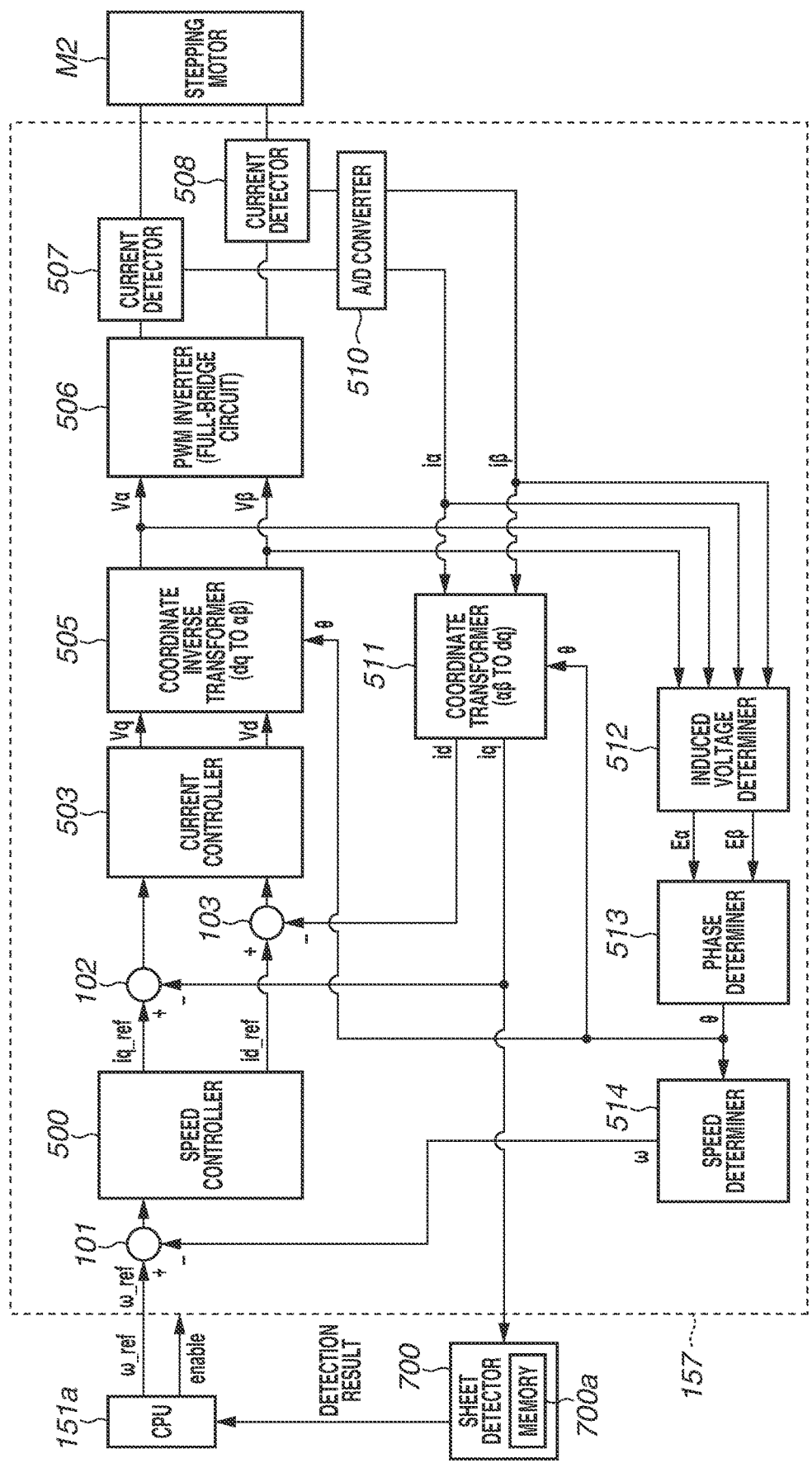
FIG. 15 is a block diagram illustrating a configuration of a motor control apparatus for performing speed feedback control.

Although, in vector control according to the first and the second embodiments, the motors are controlled through phase feedback control, the configuration is not limited thereto. For example, the motor may be controlled by feeding back the rotational speed ω of the rotor 402. More specifically, as illustrated in FIG. 15, a speed determiner 514 which is disposed in each motor control apparatus determines the rotational speed co based on the variation, in a predetermined time period, of the rotational phase θ output from the phase determiner 513. The speed is determined by the following formula (10):

$$\omega = d\theta/dt \quad (10)$$

Then, the CPU 151a outputs a instructed speed ω_ref indicating the target seed of the rotor 402. Further, a speed controller 500 which is disposed in each motor control apparatus generates and outputs a q-axis current instructed value iq_ref and a d-axis current instructed value id_ref to decrease the deviation between the rotational speed ω and the instructed speed ω_ref. The motor may be controlled through such speed feedback control. With such a configuration, a remaining sheet is detected by using the method according to the present embodiment based on the deviation Δω between the rotational speed ω and the instructed speed ω_ref, for example. The instructed speed ω_ref is the target speed of the rotor of the motor corresponding to the target speed of the circumferential speed of a roller.

A third embodiment will be described below. For configurations of the image forming apparatus 100 and the motor control apparatuses 157, 158, and 162 similar to configurations according to the first embodiment, descriptions will be omitted.

According to the present embodiment, the roller corresponding to the number N is driven while the rotational phase of the roller corresponding to the number (N+1) is being maintained, and the presence or absence of a remaining sheet is detected based on the deviation Δθ for the motor for driving the roller corresponding to the number N. The circumferential speed of a roller when detecting the presence or absence of a remaining sheet is lower than the circumferential speed of the roller during sheet conveyance when performing an image forming operation. More specifically, for example, the circumferential speed of a roller when detecting the presence or absence of a remaining sheet is set to a half of the circumferential speed of the roller during sheet conveyance when performing an image forming operation.

For example, when N=1, the conveyance roller 13 is driven while the rotational phase of the conveyance roller 12 is maintained, and the presence or absence of a remaining sheet is detected based on the deviation Δθ2 output from the motor control apparatus 157. The rotational phase of the conveyance roller 12 is maintained, for example, when the CPU 151a outputs a instructed phase θ_ref1 set to a predetermined rotational phase θ0 to the motor control apparatus 158. As a result, the motor control apparatus 158 controls the drive current flowing in the winding of the motor M1 such that the rotational phase θ of the rotor of the motor M1 becomes θ0.

Figure 12:
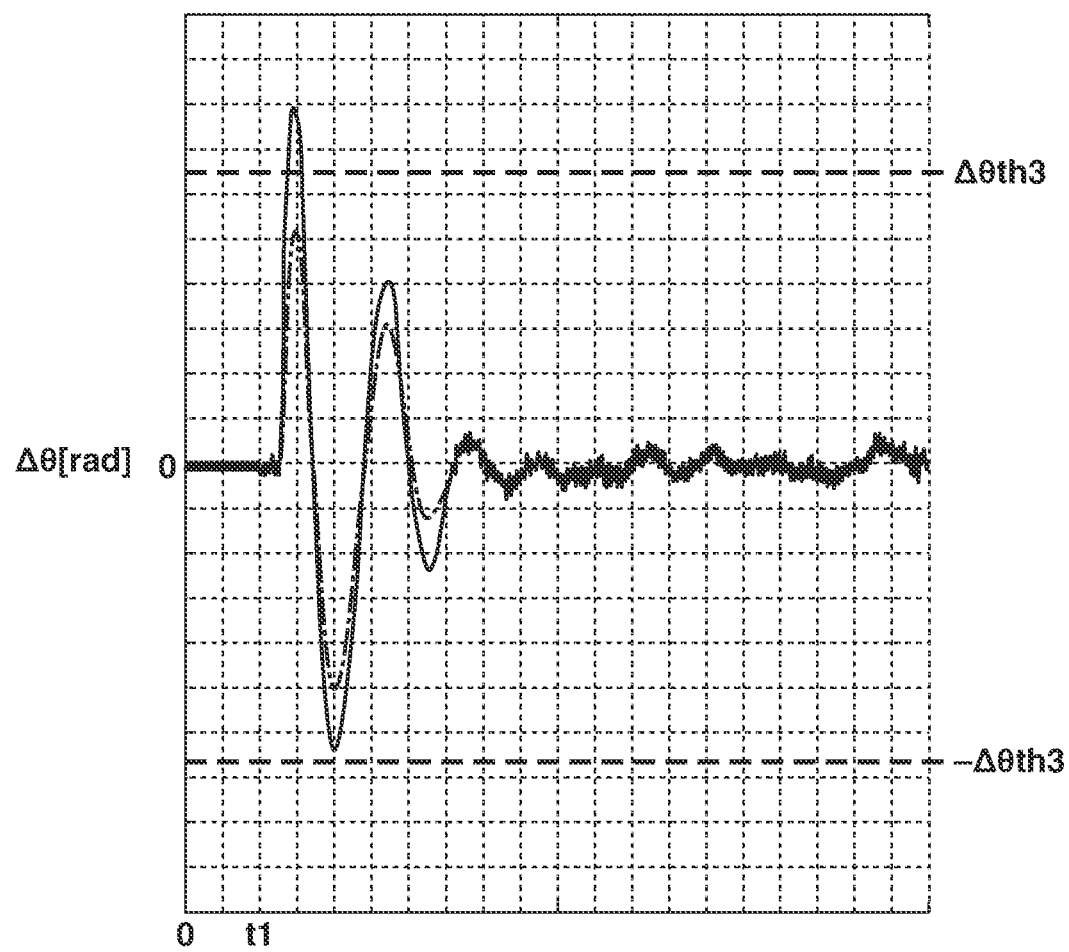
FIG. 12 illustrates an example of the deviation Δθ2 according to a third embodiment.

FIG. 12 illustrates an example of the deviation Δθ2 of the motor M2 for driving the conveyance roller 13 according to the present embodiment. The solid line in FIG. 12 indicates the deviation Δθ2 while the rotational phase of the conveyance roller 12 is maintained and the conveyance roller 13 is driven while a sheet is being nipped by both the conveyance rollers 12 and 13. The one-point chain line in FIG. 12 indicates the deviation Δθ2 when the conveyance roller 13 is being driven and the conveyance roller 12 is not being driven (no current is supplied to the motor) while a sheet is being nipped by both the conveyance rollers 12 and 13.

As illustrated in FIG. 12, the deviation Δθ2 while the rotational phase of the conveyance roller 12 is maintained and the conveyance roller 13 is being driven is larger than the deviation Δθ2 when the conveyance roller 13 is being driven and the conveyance roller 12 is not being driven. This is because, when the rotational phase of the conveyance roller 12 is maintained, the motor M2 is applied, via the sheet, with torque in the direction opposite to the direction of torque for rotating the conveyance roller 13 in the conveyance direction.

As described above, according to the present embodiment, the roller corresponding to the number N is driven while the rotational phase of the roller corresponding to the number (N+1) is maintained, and the presence or absence of a remaining sheet is detected based on the deviation Δθ for the motor for driving the roller corresponding to the number N.

As illustrated in FIG. 12, according to the present embodiment, a threshold value Δθth3 is set as a threshold value of the deviation Δθ for detecting the presence or absence of a sheet. When the acquired deviation Δθ is the threshold value Δθth3 or larger, the sheet detector 700 outputs a signal indicating that the absolute value of the deviation Δθ is the threshold value Δθth3 or larger. When the absolute value of the deviation Δθ is less than the threshold value Δθth3, the sheet detector 700 outputs a signal indicating that the absolute value of the deviation Δθ is less than the threshold value Δθth3.

The threshold value Δθth3 is set to, for example, a value larger than the threshold value Δθth2 according to the second embodiment.

The threshold value Δθth3 is set to a value less than the maximum value of the deviation Δθ assumed when the conveyance roller 13 is driven while a sheet is being nipped by both the conveyance rollers 12 and 13 and the rotational phase of the conveyance roller 12 is maintained. The maximum absolute value of the deviation Δθ assumed when the conveyance roller 13 is driven while a sheet is being nipped by both the conveyance rollers 12 and 13 and the rotational phase of the conveyance roller 12 is maintained is predetermined based on a result of measurement performed on an experimental basis.

More specifically, the absolute value of the deviation Δθ which is the threshold value Δθth3 or larger means a state where a sheet is being nipped by the conveyance roller 13 (a sheet remains in the conveyance path).

As described above, according to the present embodiment, the roller corresponding to the number N is driven while the rotational phase of the roller corresponding to the number (N+1) is maintained, and, the threshold value Δθth3 is set to a value larger than threshold value Δθth2. As a result, it becomes possible to prevent a remaining sheet from being incorrectly detected because noise mixed in the deviation Δθ exceeds a threshold value.

Figure 13:
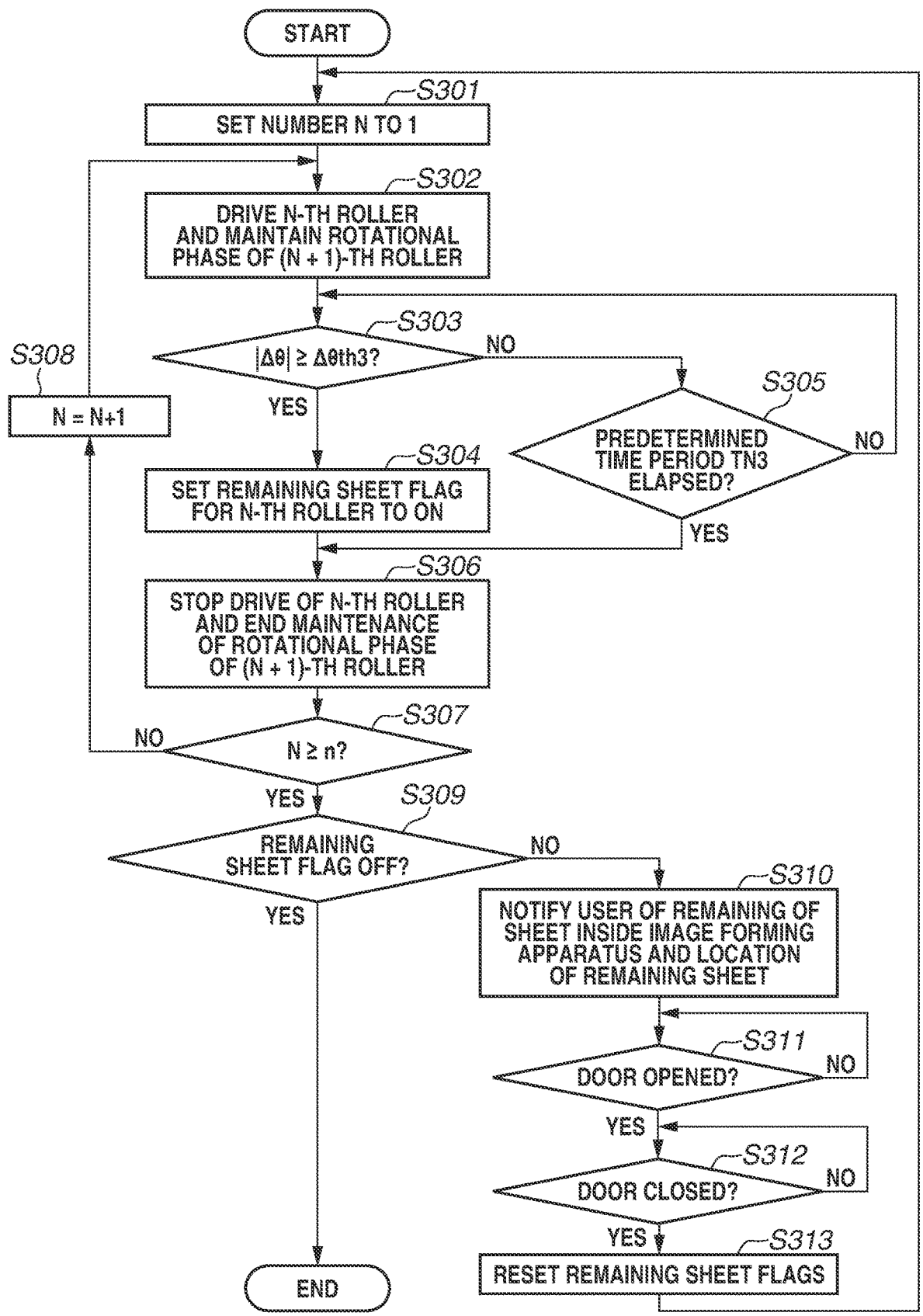
FIG. 13 is a flowchart illustrating a method for detecting a sheet remaining in the conveyance path according to the third embodiment.

FIG. 13 is a flowchart illustrating a method for detecting a sheet remaining in the conveyance path. A method for detecting a sheet remaining in the conveyance path will be described below with reference to FIG. 13. Processing of the flowchart is performed by the CPU 151a. Processing of the flowchart is started, for example, after power of the image forming apparatus 100 is turned ON, i.e., in a state where the image forming processing has not yet been started.

When power of the image forming apparatus 100 is turned ON, then in step S301, the CPU 151a sets the number N to '1'.

In step S302, the CPU 151a outputs an instruction for driving the control target motor to the motor control apparatus for controlling the motor for driving the roller corresponding to the number N. As a result, the roller corresponding to the number N is driven. The CPU 151a outputs an instruction for maintaining the rotational phase of the roller corresponding to the number (N+1) to the motor control apparatus. As a result, the motor control apparatus controls the motor such that the rotational phase of the control target motor becomes the predetermined rotational phase θ0.

When the sheet detector 700 outputs a signal indicating that the absolute value of the deviation Δθ of the motor for driving the N-th roller driven in step S302 is the threshold value Δθth3 or larger (YES in step S303), the processing proceeds to step S304. In step S304, the CPU 151*a* sets the remaining sheet flag for the roller corresponding to the number N to ON. More specifically, the CPU 151*a* stores information about a sheet being nipped by the roller corresponding to the number N, for example, in the RAM 151*c*.

On the other hand, when the absolute value of the deviation Δθ of the motor for driving the N-th roller driven in step S302 is less than the threshold value Δθth3 (NO in step S303), the processing proceeds to step S305.

When a predetermined time period TN3 has not elapsed since the motor was driven in step S302 (NO in step S305), the processing returns to step S303.

On the other hand, when the predetermined time period TN3 has elapsed since the motor was driven in step S302 (YES in step S305), the processing proceeds to step S306. In step S306, the CPU 151*a* outputs an instruction for stopping the drive of the N-th roller to the motor control apparatus for controlling the motor for driving the N-th roller. As a result, the drive of the N-th roller is stopped. The CPU 151*a* outputs an instruction for ending the maintenance of the rotational phase of the roller corresponding to the number (N+1) to the motor control apparatus. As a result, the maintenance of the rotational phase of the roller corresponding to the number (N+1) is ended.

The predetermined time period TN3 is set to a required time period during which a sheet is conveyed over the distance from the nip portion of the N-th conveyance roller to the nip portion of the (N−1)-th conveyance roller (i.e., the conveyance roller on the downstream side of the N-th conveyance roller) by the N-th conveyance roller. More specifically, the time period TN3 is set according to the distance from the nip portion of the N-th conveyance roller to the nip portion of the (N−1)-th conveyance roller (i.e., according to the number N). As a result, even while a sheet is being nipped by the N-th conveyance roller and not being nipped by the (N+1)-th conveyance roller, the leading edge of the sheet conveyed by the N-th conveyance roller reaches the nip portion of the (N−1)-th conveyance roller in a stop state. When the leading edge of a sheet reaches the nip portion of the (N−1)-th conveyance roller in a stop state, the sheet bends between the N-th and the (N−1)-th conveyance rollers. As a result, an elastic force acts on the sheet. The elastic force causes a force acting on the N-th conveyance roller in the direction opposite to the rotational direction of the roller. This results in an increase in the load torque applied to the motor for driving the N-th conveyance roller and also an increase in the absolute value of the deviation Δθ. This configuration allows detection of a remaining sheet based on the increasing deviation Δθ.

As described above, according to the present embodiment, when the absolute value of the deviation Δθ becomes the threshold value Δθth3 or larger before the time period TN3 has elapsed since the drive of the N-th conveyance roller was started, the remaining sheet flag is set to ON, and the drive of the N-th conveyance roller is stopped even before the time period TN3 has elapsed. When the absolute value of the deviation Δθ does not become the threshold value Δθth or larger before the time period TN3 has elapsed, the drive of the N-th conveyance roller is stopped.

When the number N is less than n (NO in step S307), then in step S308, the CPU 151*a* sets N to N=N+1. Then, the processing returns to step S302. n indicates the number of rollers (3 in the present embodiment) from the conveyance roller 13 to the conveyance roller on the most upstream side subjected to the detection of the presence or absence of a sheet in the conveyance direction.

On the other hand, when the number N is n or larger (YES in step S307), the processing proceeds to step S309.

Processing from step S309 to step S313 is similar to the processing from step S109 to step S113 in FIG. 8, and descriptions thereof will be omitted.

As described above, according to the present embodiment, the roller corresponding to the number N is driven while the rotational phase of the roller corresponding to the number (N+1) is maintained, and the presence or absence of a remaining sheet is detected based on the deviation Δθ for the motor for driving the roller corresponding to the number N. As a result, a remaining sheet can be detected with higher accuracy.

As described above, according to the present embodiment, a sheet remaining in the conveyance path is detected based not on a sensor such as a photo sensor but on signals output from the motor control apparatuses. This allows determination of whether a sheet is being nipped by any conveyance roller (detection of a remaining sheet) without increasing the apparatus size and the cost.

Figure 14:
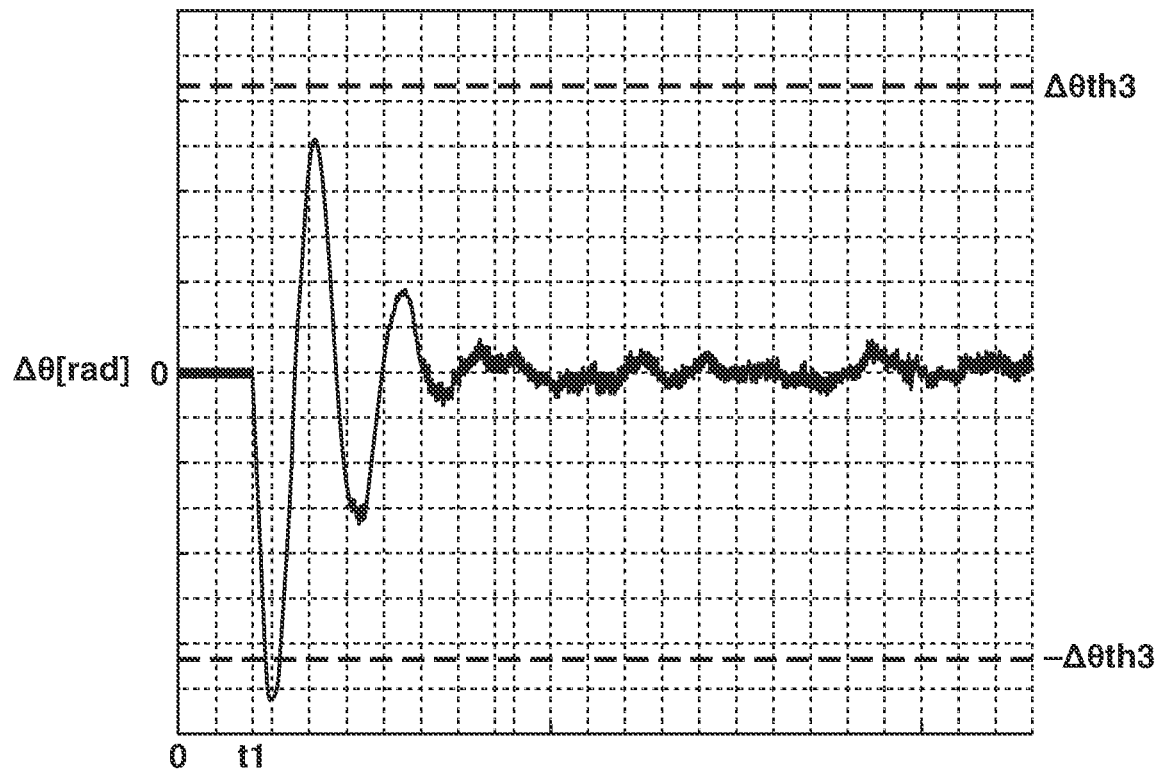
FIG. 14 illustrates an example of the deviation Δθ1 according to the third embodiment.

Although, in the present embodiment, the presence or absence of a remaining sheet is detected based on the deviation Δθ for the motor for driving the roller corresponding to the number N, the configuration is not limited thereto. For example, the presence or absence of the remaining sheet may be detected based on the deviation Δθ for the motor for driving the roller corresponding to the number (N+1). When the rotational phase of the conveyance roller 12 is maintained and the conveyance roller 13 is driven, the deviation Δθ1 fluctuates, for example, as illustrated in FIG. 14 because of the driven conveyance roller 13. This is because, when the conveyance roller 13 is driven and a sheet is conveyed in the conveyance direction, the rotational phase θ of the rotor of the motor M1 for driving the conveyance roller 12 rotating in the conveyance direction leads the instructed phase θ_ref (the predetermined rotational phase θ0).

According to the present embodiment, regardless of whether the absolute value of the deviation Δθ becomes the threshold value Δθth3 or larger in step S303 of the flowchart in FIG. 13, the number N is set to N=N+1 in step S308 when N is less than n. More specifically, when the conveyance roller 13 is driven and the rotational phase of the conveyance roller 12 is maintained (i.e., N=1), the number N is set in step S308 such that the conveyance roller 12 is driven and the rotational phase of the conveyance roller 11 is maintained. However, the configuration is not limited thereto. For example, when the absolute value of the deviation Δθ is the threshold value Δθth3 or larger in step S303, the number N may be set to N=N+2. More specifically, when the absolute value of the deviation Δθ is the threshold value Δθth3 or larger while the conveyance roller 13 is being driven and the rotational phase of the conveyance roller 12 is maintained (i.e., N=1), the number N may be set such that the conveyance roller 11 is driven and the rotational phase of the pickup roller 10 is maintained. When n is 4 or larger, the number N may be set to N=N+3.

Although, in vector control according to the present embodiment, the motors are controlled through phase feedback control, the configuration is not limited thereto. For example, as described above with reference to FIG. 15, the rotational speed ω of the rotor 402 may be fed back to control the motor. In speed feedback control, by outputting 0 to the motor control apparatus as the instructed phase ω_ref, the (N+1)-th roller can be prevented from being driven by the sheet conveyance by the N-th roller. As a result, a remaining sheet can be detected with high accuracy in a similar way to the case where the rotational phase of the (N+1)-th roller is maintained.

By turning ON a switching element on the ground side of the full-bridge circuit (H bridge circuit) of the PWM inverter 506, the rotational speed of the rotor can be reduced by an induced voltage generated in the winding by the rotation of the rotor. As a result, a remaining sheet can be detected with high accuracy like the case where the rotational phase of the (N+1)-th roller is maintained.

A fourth embodiment will be described below. For configurations of the image forming apparatus 100 and the motor control apparatuses 157, 158, and 162 similar to configurations according to the first embodiment, descriptions will be omitted.

In the second embodiment, a case has been described where, even while a sheet is being nipped by the N-th conveyance roller and not being nipped by the (N+1)-th conveyance roller, the remaining sheet can be detected when the N-th conveyance roller is driven. More specifically, when the leading edge of a sheet conveyed by the N-th conveyance roller reaches the nip portion of the (N−1)-th conveyance roller in a stop state, the sheet bends between the N-th and the (N−1)-th conveyance rollers, and accordingly an elastic force acts on the sheet. The elastic force causes a force acting on the N-th conveyance roller in the direction opposite to the rotational direction of the roller. This results in an increase in the load torque applied to the motor and also an increase in the absolute value of the deviation Δθ. A remaining sheet can be detected based on the absolute value of the deviation Δθ which increases in this way.

According to the first embodiment, even while a sheet is being nipped by the N-th conveyance roller and not being nipped by the (N+1)-th conveyance roller, the remaining sheet can be detected when the (N+1)-th and the N-th conveyance rollers (or the N-th and the (N−1)-th conveyance rollers) are driven. More specifically, when the (N−1)-th and the N-th conveyance rollers are driven, the leading edge of the sheet conveyed by the N-th conveyance roller reaches the nip portion of the (N−1)-th conveyance roller. When the leading edge of a sheet reaches the nip portion of the (N−1)-th conveyance roller and the sheet starts being conveyed by both the (N−1)-th and the N-th conveyance rollers, the deviation Δθ of the motor for driving the N-th conveyance roller fluctuates. A remaining sheet can be detected based on the deviation Δθ which fluctuates in this way.

For example, if thin paper remains in the conveyance path, the variation of the deviation Δθ when the thin paper starts being conveyed by both the (N−1)-th and the N-th conveyance rollers is larger than the variation of the deviation Δθ when the thin paper bends between the N-th and the (N−1)-th conveyance rollers. More specifically, when thin paper remains in the conveyance path, the remaining sheet detection based on the variation of the deviation Δθ when thin paper starts being conveyed by both the (N−1)-th and the N-th conveyance rollers provides higher accuracy than the remaining sheet detection based on the variation of the deviation Δθ when the thin paper bends between the N-th and the (N−1)-th conveyance rollers.

Figure 16:
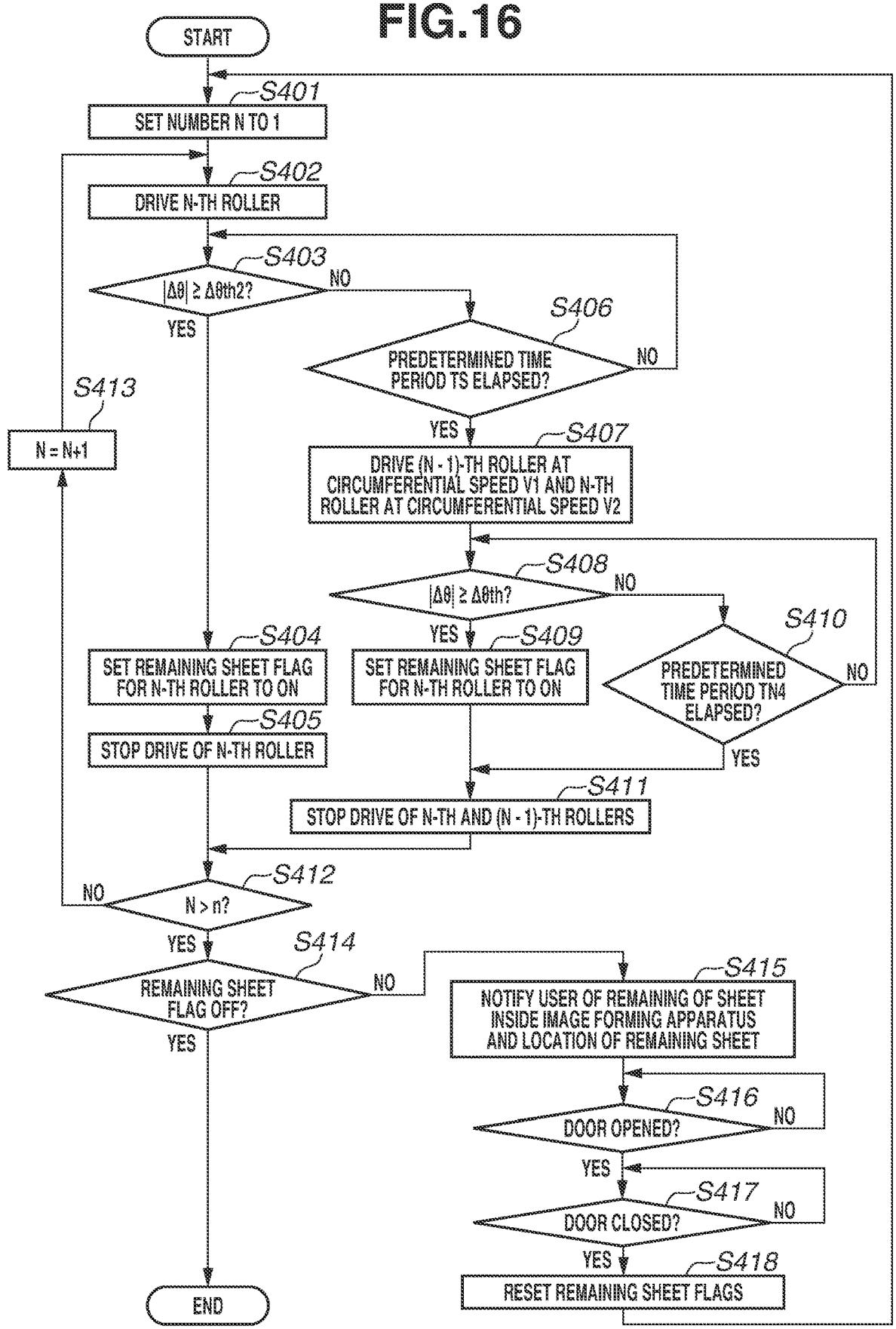
FIG. 16 is a flowchart illustrating a method for detecting a sheet remaining in the conveyance path according to a fourth embodiment.

FIG. 16 is a flowchart illustrating a method for detecting a sheet remaining in the conveyance path according to the present embodiment. A method for detecting a sheet remaining in the conveyance path will be described below with reference to FIG. 16. Processing of the flowchart is performed by the CPU 151a. Processing of the flowchart is started, for example, after power of the image forming apparatus 100 is turned ON, i.e., in a state where the image forming processing has not yet been started.

When power of the image forming apparatus 100 is turned ON, then in step S401, the CPU 151a sets the number N to '1'.

In step S402, the CPU 151a outputs an instruction for driving the control target motor to the motor control apparatus for controlling the motor for driving the roller corresponding to the number N. As a result, the roller corresponding to the number N is driven. The drive of the (N−1)-th conveyance roller has stopped.

When the sheet detector 700 outputs a signal indicating that the absolute value of the deviation Δθ of the motor for driving the N-th roller driven in step S402 is the threshold value Δθth2 or larger (YES in step S403), the processing proceeds to step S404. In step S404, the CPU 151a sets the remaining sheet flag for the roller corresponding to the number N to ON.

In step S405, the CPU 151a outputs an instruction for stopping the drive of the N-th roller to the motor control apparatus for controlling the motor for driving the N-th roller. As a result, the drive of the N-th roller is stopped. Then, the processing proceeds to step S412.

On the other hand, when the absolute value of the deviation Δθ of the motor for driving the N-th roller driven in step S402 is less than the threshold value Δθth2 (NO in step S403), the processing proceeds to step S406.

When a predetermined time period Ts has not elapsed since the motor was driven in step S402 (NO in step S406), processing returns to step S403.

On the other hand, when the predetermined time period Ts has elapsed since the motor was driven (YES in step S406), the processing proceeds to step S407. In step S407, the CPU 151a outputs an instruction for driving the control target motor to rotate the (N−1)-th conveyance roller at the circumferential speed V1, to the motor control apparatus for controlling the motor for driving the (N−1)-th conveyance roller. The CPU 151a outputs an instruction for driving the control target motor to rotate the N-th conveyance roller at the circumferential speed V2, to the motor control apparatus for controlling the motor for driving the N-th conveyance roller. As a result, the (N−1)-th conveyance roller is driven at the circumferential speed V1, and the N-th conveyance roller is driven at the circumferential speed V2.

The predetermined time period Ts is set to a time period shorter than a predetermined time period TN4 (described below). The predetermined time period Ts is set to a time period longer than the time required to increase the deviation Δθ when the N-th conveyance roller is driven in a case where a sheet remains in the conveyance path in a state of being nipped by both the N-th and the (N+1)-th conveyance rollers. As described above, according to the present embodiment, when the absolute value of the deviation Δθ becomes the threshold value Δθth2 or larger before the time period Ts has elapsed since the drive of the N-th conveyance roller was started, the remaining sheet flag is set to ON, and the drive of the N-th conveyance roller is stopped even before the time period Ts has elapsed. When the absolute value of the deviation Δθ does not become the threshold value Δθth2 or larger before the time period Ts has elapsed, the (N−1)-th conveyance roller is driven at the circumferential speed V1, and the N-th conveyance roller is driven at the circumferential speed V2.

When the sheet detector 700 outputs a signal indicating that the absolute value of the deviation Δθ of the motor for driving the N-th roller driven is the threshold value Δθth or larger (YES in step S408), the processing proceeds to step S409. In step S409, the CPU 151a sets the remaining sheet flag for the roller corresponding to the number N to ON.

On the other hand, when the absolute value of the deviation Δθ of the motor for driving the N-th roller is less than the threshold value Δθth (NO in step S408), the processing proceeds to step S410.

When the predetermined time period TN4 has not elapsed since the motor was driven in step S407 (NO in step S410), the processing returns to step S408.

On the other hand, when the predetermined time period TN4 has elapsed since the motor was driven in step S407 (YES in step S410), the processing proceeds to step S411. In step S411, the CPU 151a outputs an instruction for stopping the drive of the (N−1)-th and the N-th rollers to the motor control apparatuses for controlling the motors for driving the (N−1)-th and the N-th rollers. As a result, the drive of the (N−1)-th and the N-th rollers is stopped.

The predetermined time period TN4 is set to a required time period during which a sheet is conveyed over the distance from the nip portion of the N-th conveyance roller to the nip portion of the (N−1)-th conveyance roller by the N-th conveyance roller rotating at the circumferential speed V2. More specifically, the time period TN4 is set according to the distance from the nip portion of the N-th conveyance roller to the nip portion of the (N−1)-th conveyance roller (i.e., according to the number N). As described above, according to the present embodiment, when the absolute value of the deviation Δθ becomes the threshold value Δθth or larger before the time period TN4 has elapsed since the drive of the N-th conveyance roller was started, the remaining sheet flag is set to ON, and the drive of the (N−1)-th and the N-th conveyance rollers is stopped even before the time period TN4 has elapsed. When the absolute value of the deviation Δθ does not become the threshold value Δθth or larger before the time period TN4 has elapsed, the drive of the (N−1)-th and the N-th conveyance rollers is stopped.

When the number N is n or less (NO in step S412), then in step S413, the CPU 151a sets N to N=N+1. Then, the processing returns to step S402.

On the other hand, when the number N is larger than n (YES in step S412), the processing proceeds to step S414.

When the remaining sheet flag of any roller is ON (NO in step S414), the processing proceeds to step S415. In step S415, the CPU 151a notifies the user of the remaining of a sheet inside the image forming apparatus 100 and the location of the remaining sheet by displaying these pieces of information at the display unit of the operation unit 152.

When the door sensor 21 detects that the door 20 is opened (YES in step S416), the processing proceeds to step S417.

When the door sensor 21 detects that the door 20 is closed (YES in step S417), the processing proceeds to step S418. In step S418, the CPU 151a resets (turns OFF) the remaining sheet flags corresponding to all of the conveyance rollers. Then, the processing returns to step S401. More specifically, the CPU 151a deletes information about the remaining sheet stored in the RAM 151c.

The CPU 151a repetitively performs the processing of the flowchart until the remaining sheet flags corresponding to all of the conveyance rollers subjected to the detection of the presence or absence of a sheet are set to OFF.

As described above, according to the present embodiment, the N-th conveyance roller is driven first when detecting a remaining sheet. The drive of the (N+1)-th and the (N−1)-th conveyance rollers is stopped. When the absolute value of the deviation Δθ does not become the threshold value Δθth2 or larger before the predetermined time period Ts has elapsed since the drive of the N-th conveyance roller was started, the N-th conveyance roller is driven at the circumferential speed V2, and the (N−1)-th conveyance roller is driven at the circumferential speed V1.

As described above, according to the present embodiment, when a state where the absolute value of the deviation Δθ is less than the threshold value Δθth2 continues for the predetermined time period Ts, i.e., when a sheet is not being nipped by at least one of the N-th and the (N+1)-th conveyance rollers, both the N-th and the (N−1)-th conveyance rollers are driven. As a result, for example, while a sheet is being nipped by the N-th conveyance roller and not being nipped by the (N+1)-th conveyance roller, it is possible to increase the variation of the deviation Δθ for the motor for driving the N-th conveyance roller when the leading edge of the sheet conveyed by the N-th conveyance roller reaches the nip portion of the (N−1)-th conveyance roller. As a result, a remaining sheet can be detected with higher accuracy.

As described above, according to the present embodiment, a sheet remaining in the conveyance path is detected based not on a sensor such as a photo sensor but on signals output from the motor control apparatuses. This allows determination of whether a sheet is being nipped by any conveyance roller (detection of a remaining sheet) without increasing the apparatus size and the cost.

According to the present embodiment, when detecting a remaining sheet, the N-th conveyance roller is driven first while the drive of the (N+1)-th and the (N−1)-th conveyance rollers is stopped. When the absolute value of the deviation Δθ does not become the threshold value Δθth2 or larger before the predetermined time period Ts has elapsed since the drive of the N-th conveyance roller was started, the N-th conveyance roller is driven at the circumferential speed V2, and the (N−1)-th conveyance roller is driven at the circumferential speed V1. More specifically, according to the present embodiment, the method according to the second embodiment is performed first and, if a remaining sheet is not immediately detected, the method according to the first embodiment is performed. However, the configuration is not limited thereto. For example, the method according to the third embodiment is performed first and, if a remaining sheet is not immediately detected, the method according to the first embodiment is performed. More specifically, while the drive of the (N−1)-th conveyance roller is stopped, the rotational phase of the (N+1)-th conveyance roller is maintained, and the N-th conveyance roller is driven first. When the absolute value of the deviation Δθ does not become the threshold value Δθth2 or larger before the predetermined time period Ts has elapsed since the drive of the N-th conveyance roller was started, the N-th conveyance roller is driven at the circumferential speed V2, and the (N−1)-th conveyance roller is driven at the circumferential speed V2. A remaining sheet may be detected in this configuration.

Although, in the first to fourth embodiments, the remaining sheet detection is started when power of the image forming apparatus 100 is turned ON, the configuration is not limited thereto. For example, the remaining sheet detection may be started when the image forming apparatus 100 returns from the sleep state after completion of jam treatment in the image forming apparatus 100. More specifically, the remaining sheet detection may be started in a time period since sheet conveyance is stopped until a sheet feed operation is resumed. The sleep state corresponds to a power-saving mode for restricting the power consumption of the image forming apparatus 100, when the operation of the image forming apparatus 100 is not performed for a predetermined time period, for example.

Although, in the first to fourth embodiments, the conveyance roller 13 is set as the roller corresponding to N=1, the configuration is not limited thereto. For example, the discharge roller 17 may be set as the roller corresponding to N=1. In this case, for example, the roller corresponding to N=7 is set as the conveyance roller 11.

Although, in the first to fourth embodiments, the threshold value of the deviation $\Delta\theta$ is a predetermined value regardless of the paper type, a threshold value may be set for each paper type.

Although, in the first to fourth embodiments, the remaining sheet flag of the N-th roller is set to ON, the remaining sheet flag of the (N+1)-th roller may be set to ON.

The function of the sheet detector 700 may be provided by the CPU 151a.

Although, in the first to fourth embodiments, motors are driven for a predetermined time period when a sequence for detecting a remaining sheet is performed, the configuration is not limited thereto. For example, the drive time may be changed for each drive target roller and motor.

Although, in the first, second, and fourth embodiments, one motor is provided for each of the rollers corresponding to N=1 to 3, two rollers may be driven by one motor. For example, the conveyance rollers 12 and 13 may be driven by the motor M1. In such a configuration, for example, when the rotating shaft of the motor M1 is connected with each roller via a clutch. By connecting and separating the motor M1 and each roller via clutches, the motor M1 can drive one or two rollers.

In the first to fourth embodiments, the sheet detector 700 outputs a signal indicating that the absolute value of the deviation is a threshold value or larger when the absolute value of the deviation is the threshold value or larger, and outputs a signal indicating that the absolute value of the deviation is less than the threshold value when the absolute value of the deviation is less than the threshold value. However, the configuration is not limited thereto. For example, the sheet detector 700 may output to the CPU 151a a signal indicating that a sheet is being nipped by a conveyance roller when the absolute value of the deviation changes from a value less than a threshold value to the threshold value or larger.

Figure 17A:
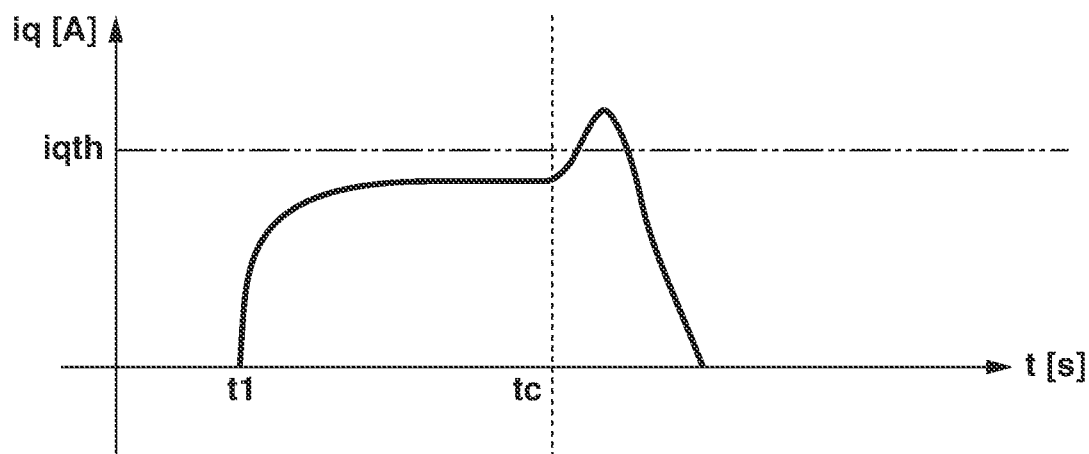
FIGS. 17A and 17B illustrate examples of a current value iq of a motor for driving a conveyance roller.
Figure 17B:
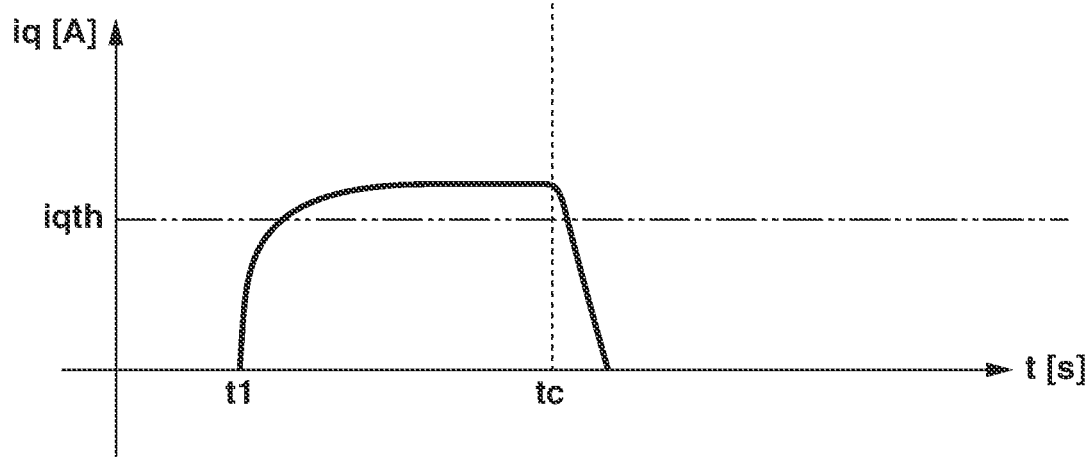

Although, in the first to fourth embodiments, the remaining sheet detection is performed based on the deviation $\Delta\theta$, the configuration is not limited thereto. For example, the remaining sheet detection may be performed based on the current value iq output from the coordinate transformer 511. For example, according to the first embodiment, the current value iq of the motor for driving the N-th conveyance roller is as illustrated in FIG. 17A, and the current value iq of the motor for driving the (N+1)-th conveyance roller is as illustrated in FIG. 17B. Time tc indicates time when the leading edge of a sheet conveyed by the (N+1)-th conveyance roller in a state of being nipped by the (N+1)-th conveyance roller and not being nipped by the N-th conveyance roller reaches the nip portion of the N-th conveyance roller. Changes of the current value iq illustrated in FIGS. 17A and 17B are illustrative and are not limited to FIGS. 17A and 17B.

When the remaining sheet detection is performed based on the current value iq of the N-th motor, the sheet detector 700 outputs a signal indicating that a sheet is being nipped by the N-th conveyance roller, for example, when the current value iq changes from a value less than a threshold value iqth to a value larger than the threshold value iqth. When the remaining sheet detection is performed based on the current value iq of the (N+1)-th motor, the sheet detector 700 outputs a signal indicating that a sheet is being nipped by the N-th conveyance roller, for example, when the current value iq changes from a value larger than the threshold value iqth to a value less than the threshold value iqth. The remaining sheet detection may be performed based on a change of the q-axis current instructed value (target value) iq_ref determined based on the deviation between the instructed phase $\theta$_ref and the rotational phase $\theta$ determined by the phase determiner 513. The remaining sheet detection may be performed based on a change of the amplitude of the current value i$\alpha$ or i$\beta$ in the stationary coordinate system.

The first to fourth embodiments are applied not only to motor control based on vector control. For example, the first to fourth embodiments may also be applied to a motor control apparatus configured to feed back the rotational phase and rotational speed.

Although, in the first to fourth embodiments, a stepping motor is used as a motor for driving a load, another motor such as a direct-current (DC) motor is also applicable. The first to fourth embodiments are applicable not only to a 2-phase motor but also to a 3-phase motor.

The deviations $\Delta\theta$ and $\Delta\omega$, the current values iq and iq_ref, and the amplitude of the current value i$\alpha$ or i$\beta$ in the stationary coordinate system correspond to a parameter corresponding to the load torque applied to the rotor of a motor. The parameter corresponding to the load torque changes when a sheet is conveyed by adjacent conveyance rollers (for example, the conveyance rollers 12 and 13).

Although, in the first to fourth embodiments, a permanent magnet is used as a rotor, the configuration is not limited thereto.

According to the present disclosure, a sheet can be detected with high accuracy in a less expensive configuration.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2018-004912, filed Jan. 16, 2018, which is hereby incorporated by reference herein in its entirety.

What is claimed is:

1. A sheet conveyance apparatus comprising:
   a stacking unit on which a sheet is to be stacked;
   a feeding unit configured to feed the sheet stacked on the stacking unit;
   a first conveyance roller configured to convey the sheet fed by the feeding unit;
   a motor configured to drive the first conveyance roller;
   a phase determiner configured to determine a rotational phase of a rotor of the motor;
   a first controller configured to control a drive current flowing in a winding of the motor to reduce a deviation between an instructed phase representing a target phase of the rotor of the motor and the rotational phase determined by the phase determiner;

a second controller configured to control the first controller to perform a first drive for driving the first conveyance roller before a feed operation by the feeding unit is started; and a discriminator configured to discriminate presence or absence of the sheet at a nip portion of the first conveyance roller based on a value of a parameter corresponding to load torque applied, during the first drive, to the rotor.

2. The sheet conveyance apparatus according to claim 1, further comprising a second conveyance roller adjacent to the first conveyance roller, wherein the second controller drives the first and second conveyance rollers during the first drive, and wherein, based on the parameter value, the discriminator discriminates presence or absence of the sheet at the nip portion of the first conveyance roller.

3. The sheet conveyance apparatus according to claim 2, wherein an upstream conveyance roller is disposed on an upstream side in a sheet conveyance direction, the sheet conveyance apparatus further comprising a third conveyance roller adjacent to the upstream conveyance roller, wherin the upstream conveyance roller is one of the first and second conveyance rollers, wherein the third conveyance roller is disposed on an upstream side of the upstream conveyance roller in the sheet conveyance direction, wherein, after the discrimination by the discriminator during the first drive is completed and before the feed operation is started, the second controller performs a second drive for driving the third conveyance roller, from a stop state, and driving the upstream conveyance roller, wherein, the parameter is a first parameter, the rotor is a first rotor, and the motor is a first motor, wherein a value of a second parameter corresponds to load torque applied, during the second drive, to a second rotor of a second motor for driving, as a driven conveyance roller, one of the upstream conveyance roller or the third conveyance roller, and wherein, based on the second parameter value, the discriminator discriminates presence or absence of the sheet at a nip portion of the driven conveyance roller driven by the second motor.

4. The sheet conveyance apparatus according to claim 3, wherein a circumferential speed of the third conveyance roller is lower than a circumferential speed of the upstream conveyance roller.

5. The sheet conveyance apparatus according to claim 2, wherein a circumferential speed of an upstream conveyance roller disposed on an upstream side in a sheet conveyance direction out of the first and the second conveyance rollers is lower than a circumferential speed of a downstream conveyance roller on a downstream side in the sheet conveyance direction out of the first and second conveyance rollers.

6. The sheet conveyance apparatus according to claim 2, further comprising:

a third conveyance roller disposed on an upstream side of the first and second conveyance rollers in a sheet conveyance direction; and a fourth conveyance roller adjacent to the third conveyance roller, wherein, after the discrimination by the discriminator during the first drive is completed and before the feed operation is started, the second controller starts a second drive for driving the third and fourth conveyance rollers for a predetermined time period, wherein, the parameter is a first parameter, the rotor is a first rotor, and the motor is a first motor, wherein a value of a second parameter corresponds to load torque applied, during the second drive, to a second rotor of a second motor for driving, as a driven conveyance roller, one of the third and fourth conveyance rollers, and wherein, based on the second parameter value, the discriminator discriminates presence or absence of the sheet at a nip portion of the driven conveyance roller driven by the second motor.

7. The sheet conveyance apparatus according to claim 6, wherein a circumferential speed of an upstream conveyance roller disposed on the upstream side in the sheet conveyance direction out of the third and fourth conveyance rollers is lower than a circumferential speed of a downstream conveyance roller on a downstream side in the sheet conveyance direction out of the third and fourth conveyance rollers.

8. The sheet conveyance apparatus according to claim 6, wherein a downstream conveyance roller on a downstream side in the sheet conveyance direction out of the third and fourth conveyance rollers is adjacent to an upstream conveyance roller disposed on the upstream side in the sheet conveyance direction out of the first and second conveyance rollers.

9. The sheet conveyance apparatus according to claim 8, wherein a circumferential speed of the downstream conveyance roller is lower than a circumferential speed of the upstream conveyance roller.

10. The sheet conveyance apparatus according to claim 2, wherein the second conveyance roller is disposed adjacent to the first conveyance roller on an upstream side of the first conveyance roller in a sheet conveyance direction, wherein, after the discrimination by the discriminator during the first drive is completed and before the feed operation is started, the second controller performs a second drive for driving the second conveyance roller for a predetermined time period, wherein, the parameter is a first parameter, the rotor is a first rotor, and the motor is a first motor, wherein a value of a second parameter corresponds to load torque applied, during the second drive, to a second rotor of a second motor for driving the second conveyance roller, and wherein, based on the second parameter value, the discriminator discriminates presence or absence of the sheet at a nip portion of the second conveyance roller driven by the second motor.

11. The sheet conveyance apparatus according to claim 1, further comprising:

a second conveyance roller adjacent to the first conveyance roller, and disposed on an upstream side of the first conveyance roller in a sheet conveyance direction;

a second motor configured to drive the second conveyance roller; and a third controller configured to control the second motor, wherein, during the first drive, the third controller controls the second motor to prevent rotation of the second conveyance roller by the conveyance of the sheet by the first conveyance roller, even in a state of the sheet being nipped by the second conveyance roller, and wherein, during the first drive, the discriminator discriminates presence or absence of the sheet at the nip portion of the first conveyance roller based on the parameter value.

12. The sheet conveyance apparatus according to claim 1, wherein the parameter corresponding to the load torque is the deviation between the instructed phase and the rotational phase, and
wherein, in a case where an absolute value of the deviation is larger than a predetermined value, the discriminator discriminates that the sheet is present at the nip portion of the first conveyance roller.

13. The sheet conveyance apparatus according to claim 12, wherein, when a state where the absolute value of the deviation is less than the predetermined value continues for a predetermined time period, the discriminator discriminates that the sheet is absent at the nip portion of the first conveyance roller.

14. The sheet conveyance apparatus according to claim 1, wherein a circumferential speed of a third conveyance roller is higher than a circumferential speed of the first conveyance roller.

15. The sheet conveyance apparatus according to claim 1, wherein, in a case where the sheet is discriminated to be present at the nip portion of the first conveyance roller, the drive of the first conveyance roller is stopped.

16. The sheet conveyance apparatus according to claim 1, further comprising:
a storage unit configured to store information about a conveyance roller at which the sheet is discriminated to be present; and
a notification unit configured to perform notification of the information stored in the storage unit.

17. The sheet conveyance apparatus according to claim 1, wherein the discriminator discriminates presence or absence of the sheet at the nip portion of the first conveyance roller during one of the following: after power of the sheet conveyance apparatus is turned ON, after jam treatment in the sheet conveyance apparatus is completed, or after the sheet conveyance apparatus returns from a sleep state.

18. The sheet conveyance apparatus according to claim 1, wherein, based on a value of a torque current component (i) which is represented in a rotating coordinate system based on the rotational phase determined by the phase determiner and (ii) generates torque on the rotor, the first controller controls the drive current.

19. A sheet conveyance apparatus comprising:
a stacking unit on which a sheet is to be stacked;
a feeding unit configured to feed the sheet stacked on the stacking unit;
a conveyance roller configured to convey the sheet fed by the feeding unit;
a motor configured to drive the conveyance roller;
a speed determiner configured to determine a rotational speed of a rotor of the motor;
a first controller configured to control a drive current flowing in a winding of the motor to reduce a deviation between an instructed speed representing a target speed of the rotor of the motor and the rotational speed determined by the speed determiner;
a second controller configured to control the first controller to perform a first drive for driving the conveyance roller before a feed operation by the feeding unit is started; and
a discriminator configured to discriminate presence or absence of the sheet at a nip portion of the conveyance roller based on a value of a parameter corresponding to load torque applied, during the first drive, to the rotor.

20. A sheet conveyance apparatus comprising:
a conveyance roller configured to convey a sheet;
a motor configured to drive the conveyance roller;
a phase determiner configured to determine a rotational phase of a rotor of the motor;
a first controller configured to control a drive current flowing in a winding of the motor to reduce a deviation between an instructed phase representing a target phase of the rotor of the motor and the rotational phase determined by the phase determiner;
a second controller configured to control the first controller to perform a first drive for driving the conveyance roller before a conveyance operation for the sheet is started; and
a discriminator configured to discriminate presence or absence of the sheet at a nip portion of the conveyance roller based on a value of a parameter corresponding to load torque applied, during the first drive, to the rotor.

21. A sheet conveyance apparatus comprising:
a conveyance roller configured to convey a sheet;
a motor configured to drive the conveyance roller;
a speed determiner configured to determine a rotational speed of a rotor of the motor;
a first controller configured to control a drive current flowing in a winding of the motor to reduce a deviation between an instructed speed representing a target speed of the rotor of the motor and the rotational speed determined by the speed determiner;
a second controller configured to control the first controller to perform a first drive for driving the conveyance roller before a conveyance operation for the sheet is started; and
a discriminator configured to discriminate presence or absence of the sheet at a nip portion of the conveyance roller based on a value of a parameter corresponding to load torque applied, during the first drive, to the rotor.

22. An image forming apparatus comprising:
a stacking unit on which a sheet is to be stacked;
a feeding unit configured to feed the sheet stacked on the stacking unit;
a conveyance roller configured to convey the sheet fed by the feeding unit;
an image forming unit configured to form an image on the sheet conveyed by the conveyance roller;
a motor configured to drive the conveyance roller;
a phase determiner configured to determine a rotational phase of a rotor of the motor;
a first controller configured to control a drive current flowing in a winding of the motor to reduce a deviation between an instructed phase representing a target phase of the rotor of the motor and the rotational phase determined by the phase determiner;
a second controller configured to control the first controller to perform a first drive for driving the conveyance roller before a feed operation by the feeding unit is started; and
a discriminator configured to discriminate presence or absence of the sheet at a nip portion of the conveyance roller based on a value of a parameter corresponding to load torque applied, during the first drive, to the rotor.

23. A sheet conveyance apparatus comprising:
a stacking unit on which a sheet is to be stacked;
a feeding unit configured to feed the sheet stacked on the stacking unit;

a conveyance roller configured to convey the sheet fed by the feeding unit;
a motor configured to drive the conveyance roller;
a phase determiner configured to determine a rotational phase of a rotor of the motor;
a first controller configured to control a drive current flowing in a winding of the motor to reduce a deviation between an instructed phase representing a target phase of the rotor of the motor and the rotational phase determined by the phase determiner;
a second controller configured to control the first controller to perform a first drive for driving the conveyance roller after a first timing that power of the sheet conveyance apparatus switches from OFF to ON, and before a second timing, that is after the first timing, for the feeding unit to initially start feeding of the sheet; and
a discriminator configured to discriminate presence or absence of the sheet at a nip portion of the conveyance roller based on a value of a parameter corresponding to load torque applied to the rotor during the first drive.

24. The sheet conveyance apparatus according to claim 23, wherein, based on a value of a torque current component (i) which is represented in a rotating coordinate system based on the rotational phase determined by the phase determiner and (ii) generates torque on the rotor, the first controller controls the drive current.

25. A sheet conveyance apparatus comprising:
a stacking unit on which a sheet is to be stacked;
a feeding unit configured to feed the sheet stacked on the stacking unit;
a conveyance roller configured to convey the sheet fed by the feeding unit;
an opening/closing member configured to open a conveyance guide configured to guide the sheet;
an opening/closing detecting unit configured to detect whether the opening/closing member is in a close state or not;
a motor configured to drive the conveyance roller;
a phase determiner configured to determine a rotational phase of a rotor of the motor;
a first controller configured to control a drive current flowing in a winding of the motor to reduce a deviation between an instructed phase representing a target phase of the rotor of the motor and the rotational phase determined by the phase determiner;
a second controller configured to control the first controller to perform a first drive for driving the conveyance roller after a first timing that the opening/closing detecting unit detects that the opening/closing member switches from an open state to the close state, and before a second timing, that is after the first timing, for the feeding unit to initially start feeding of the sheet; and
a discriminator configured to discriminate presence or absence of the sheet at a nip portion of the conveyance roller based on a value of a parameter corresponding to load torque applied, during the first drive, to the rotor.

26. The sheet conveyance apparatus according to claim 25, wherein, based on a value of a torque current component (i) which is represented in a rotating coordinate system based on the rotational phase determined by the phase determiner and (ii) generates torque on the rotor, the first controller controls the drive current.

27. A sheet conveyance apparatus comprising:
a stacking unit on which a sheet is to be stacked;
a feeding unit configured to feed the sheet stacked on the stacking unit;
a conveyance roller configured to convey the sheet fed by the feeding unit;
a motor configured to drive the conveyance roller;
a speed determiner configured to determine a rotational speed of a rotor of the motor;
a first controller configured to control a drive current flowing in a winding of the motor to reduce a deviation between an instructed speed representing a target speed of the rotor of the motor and the rotational speed determined by the speed determiner;
a second controller configured to control the first controller to perform a first drive for driving the conveyance roller after a first timing that power of the sheet conveyance apparatus switches from OFF to ON, and before a second timing, that is after the first timing, for the feeding unit to initially start feeding of the sheet; and
a discriminator configured to discriminate presence or absence of the sheet at a nip portion of the conveyance roller based on a value of a parameter corresponding to load torque applied, during the first drive, to the rotor.

28. The sheet conveyance apparatus according to claim 27, further comprising a phase determiner configured to determine a rotational phase of the rotor of the motor,
wherein, based on a value of a torque current component (i) which is represented in a rotating coordinate system based on the rotational phase determined by the phase determiner and (ii) generates torque on the rotor, the first controller controls the drive current.

29. A sheet conveyance apparatus comprising:
a stacking unit on which a sheet is to be stacked;
a feeding unit configured to feed the sheet stacked on the stacking unit;
a conveyance roller configured to convey the sheet fed by the feeding unit;
an opening/closing member configured to open a conveyance guide configured to guide the sheet;
an opening/closing detecting unit configured to detect whether the opening/closing member is in a close state or not;
a motor configured to drive the conveyance roller;
a speed determiner configured to determine a rotational speed of a rotor of the motor;
a first controller configured to control a drive current flowing in a winding of the motor to reduce a deviation between an instructed speed representing a target speed of the rotor of the motor and the rotational speed determined by the speed determiner;
a second controller configured to control the first controller to perform a first drive for driving the conveyance roller after a first timing that the opening/closing detecting unit detects that the opening/closing member switches from an open state to the close state, and before a second timing, that is after the first timing, for the feeding unit to initially start feeding of the sheet; and
a discriminator configured to discriminate presence or absence of the sheet at a nip portion of the conveyance roller based on a value of a parameter corresponding to load torque applied, during the first drive, to the rotor.

30. The sheet conveyance apparatus according to claim 29, further comprising a phase determiner configured to determine a rotational phase of the rotor of the motor,
wherein, based on a value of a torque current component (i) which is represented in a rotating coordinate system based on the rotational phase determined by the phase determiner and (ii) generates torque on the rotor, the first controller controls the drive current.

31. A sheet conveyance apparatus comprising:
a conveyance roller configured to convey a sheet;
a motor configured to drive the conveyance roller;
a phase determiner configured to determine a rotational phase of a rotor of the motor;
a first controller configured to control a drive current flowing in a winding of the motor to reduce a deviation between an instructed phase representing a target phase of the rotor of the motor and the rotational phase determined by the phase determiner;
a second controller configured to control the first controller to perform a first drive for driving the conveyance roller after a first timing that power of the sheet conveyance apparatus switches from OFF to ON, and before a second timing, that is after the first timing, to initially start feeding of the sheet; and
a discriminator configured to discriminate presence or absence of the sheet at a nip portion of the conveyance roller based on a value of a parameter corresponding to load torque applied, during the first drive, to the rotor.

32. A sheet conveyance apparatus comprising:
a conveyance roller configured to convey a sheet;
a motor configured to drive the conveyance roller;
a speed determiner configured to determine a rotational speed of a rotor of the motor;
a first controller configured to control a drive current flowing in a winding of the motor to reduce a deviation between an instructed speed representing a target speed of the rotor of the motor and the rotational speed determined by the speed determiner;
a second controller configured to control the first controller to perform a first drive for driving the conveyance roller after a first timing that power of the sheet conveyance apparatus switches from OFF to ON, and before a second timing, that is after the first timing, to initially start feeding of the sheet; and
a discriminator configured to discriminate presence or absence of the sheet at a nip portion of the conveyance roller based on a value of a parameter corresponding to load torque applied, during the first drive, to the rotor.

33. A sheet conveyance apparatus comprising:
a conveyance roller configured to convey a sheet;
an opening/closing member configured to open a conveyance guide configured to guide the sheet;
an opening/closing detecting unit configured to detect whether the opening/closing member is in a close state or not;
a motor configured to drive the conveyance roller;
a phase determiner configured to determine a rotational phase of a rotor of the motor;
a first controller configured to control a drive current flowing in a winding of the motor to reduce a deviation between an instructed phase representing a target phase of the rotor of the motor and the rotational phase determined by the phase determiner;
a second controller configured to control the first controller to perform a first drive for driving the conveyance roller after a first timing that the opening/closing detecting unit detects that the opening/closing member switches from an open state to the close state, and before a second timing, that is after the first timing, to initially start feeding of the sheet; and
a discriminator configured to discriminate presence or absence of the sheet at a nip portion of the conveyance roller based on a value of a parameter corresponding to load torque applied, during the first drive, to the rotor.

34. A sheet conveyance apparatus comprising:
a conveyance roller configured to convey a sheet;
an opening/closing member configured to open a conveyance guide configured to guide the sheet;
an opening/closing detecting unit configured to detect whether the opening/closing member is in a close state or not;
a motor configured to drive the conveyance roller;
a speed determiner configured to determine a rotational speed of a rotor of the motor;
a first controller configured to control a drive current flowing in a winding of the motor to reduce a deviation between an instructed speed representing a target speed of the rotor of the motor and the rotational speed determined by the speed determiner;
a second controller configured to control the first controller to perform a first drive for driving the conveyance roller after a first timing that the opening/closing detecting unit detects that the opening/closing member switches from an open state to the close state, and before a second timing, that is after the first timing, to initially start feeding of the sheet; and
a discriminator configured to discriminate presence or absence of the sheet at a nip portion of the conveyance roller based on a value of a parameter corresponding to load torque applied, during the first drive, to the rotor.

* * * * *